US008313704B2

(12) United States Patent
Ogawa et al.

(10) Patent No.: US 8,313,704 B2
(45) Date of Patent: Nov. 20, 2012

(54) SPOUTED BED DEVICE, POLYOLEFIN PRODUCTION SYSTEM WITH SPOUTED BED DEVICE, AND POLYOLEFIN PRODUCTION PROCESS

(75) Inventors: Hiroyuki Ogawa, Ichihara (JP); Hideki Sato, Ichihara (JP); Hiroshi Ueda, Takarazuka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 36 days.

(21) Appl. No.: 12/332,112

(22) Filed: Dec. 10, 2008

(65) Prior Publication Data

US 2010/0069581 A1 Mar. 18, 2010

(30) Foreign Application Priority Data

Dec. 11, 2007 (JP) ................. 2007-320166

(51) Int. Cl.
*B01J 8/18* (2006.01)
*B01J 19/00* (2006.01)
*C08F 2/34* (2006.01)
(52) U.S. Cl. ........................ 422/139; 422/131
(58) Field of Classification Search .................. 432/139; 422/139, 129, 131
See application file for complete search history.

(56) References Cited

U.S. PATENT DOCUMENTS

| 2,477,454 A | 7/1949 | Heath |
| 2,867,506 A | 1/1959 | Roberts |
| 2,890,106 A | 6/1959 | Heath |
| 2,936,303 A | 5/1960 | Goins |
| 3,079,222 A | 2/1963 | Reeve |
| 3,242,586 A * | 3/1966 | Peterson .................. 34/589 |
| 3,262,922 A | 7/1966 | Payne |
| 3,495,952 A | 2/1970 | Ulbrecht |
| 3,644,583 A | 2/1972 | Scoggin |
| 3,652,527 A | 3/1972 | Trieschmann |
| 3,719,029 A | 3/1973 | Suzukawa et al. |
| 3,770,714 A | 11/1973 | Dorschner et al. |
| 3,776,979 A | 12/1973 | Hill |
| 3,922,322 A | 11/1975 | Roger et al. |
| 3,957,448 A | 5/1976 | Shepard et al. |

(Continued)

FOREIGN PATENT DOCUMENTS

CA 739660 A 8/1966

(Continued)

OTHER PUBLICATIONS

K.B. Mathur and P.E. Gishler. "A Technique for Contacting Gases with Coarse Solid Particles." AIChE Journal 1. 2 (1955), 157-164.*

(Continued)

*Primary Examiner* — Fred M Teskin
*Assistant Examiner* — Elizabeth Eng
(74) *Attorney, Agent, or Firm* — Birch, Stewart, Kolasch & Birch, LLP

(57) ABSTRACT

A spouted bed device according to the present invention includes a vertically extending cylinder; a decreasing diameter member which is formed on the cylinder, has an inside diameter that decreases progressively downward, and has a gas inlet orifice at a bottom end thereof; and a tubular portion which extends downward from an edge of the gas inlet orifice. A spouted bed is formed in a treatment zone enclosed by a top surface of the decreasing diameter member and an inner wall of the cylinder above the decreasing diameter member.

12 Claims, 6 Drawing Sheets

U.S. PATENT DOCUMENTS

| | | | |
|---|---|---|---|
| 3,971,768 | A | 7/1976 | Peters et al. |
| 4,129,701 | A | 12/1978 | Jezl et al. |
| 4,337,722 | A | 7/1982 | Debayeux et al. |
| 4,373,272 | A | 2/1983 | Jones et al. |
| 4,404,083 | A * | 9/1983 | Vasalos .................. 208/410 |
| 4,419,330 | A | 12/1983 | Ishihara et al. |
| 4,441,822 | A * | 4/1984 | Biswas et al. .............. 366/101 |
| 4,457,896 | A | 7/1984 | Kono |
| 4,466,082 | A | 8/1984 | Zoschak et al. |
| 4,518,750 | A | 5/1985 | Govoni et al. |
| 4,533,367 | A * | 8/1985 | Hadzismajlovic ............ 95/211 |
| 4,578,183 | A * | 3/1986 | Chou et al. ................ 208/113 |
| 4,640,339 | A | 2/1987 | Klaren |
| 4,744,413 | A | 5/1988 | Klaren et al. |
| 5,034,195 | A | 7/1991 | Platz |
| 5,084,540 | A * | 1/1992 | Albizzati et al. .......... 526/348.6 |
| 5,213,768 | A | 5/1993 | Maurel et al. |
| 5,235,009 | A | 8/1993 | Hogan |
| 5,244,990 | A * | 9/1993 | Mitchell .................. 526/119 |
| 5,245,093 | A | 9/1993 | Ember |
| 5,536,378 | A | 7/1996 | Gibson et al. |
| 5,674,308 | A | 10/1997 | Meissner et al. |
| 5,676,201 | A | 10/1997 | Klaren |
| 6,066,701 | A | 5/2000 | Koveal et al. |
| 6,306,981 | B1 | 10/2001 | Brown et al. |
| 6,441,108 | B1 | 8/2002 | Haendeler et al. |
| 6,444,763 | B1 | 9/2002 | Sagae et al. |
| 6,518,372 | B1 | 2/2003 | Weickert |
| 6,689,845 | B1 | 2/2004 | Govoni et al. |
| 7,270,791 | B2 | 9/2007 | Davis et al. |
| 7,601,303 | B1 | 10/2009 | Karer et al. |
| 2006/0058474 | A1 | 3/2006 | Covezzi et al. |
| 2006/0063896 | A1 | 3/2006 | McElvain et al. |
| 2007/0004879 | A1 | 1/2007 | Penzo et al. |
| 2007/0217966 | A1* | 9/2007 | Heino et al. .................. 422/143 |
| 2009/0036617 | A1 | 2/2009 | Mei et al. |
| 2009/0062586 | A1 | 3/2009 | Hamba |
| 2009/0149610 | A1 | 6/2009 | Sato et al. |
| 2009/0149620 | A1 | 6/2009 | Sato et al. |
| 2010/0069581 | A1 | 3/2010 | Ogawa et al. |
| 2010/0311923 | A1 | 12/2010 | Sato et al. |

FOREIGN PATENT DOCUMENTS

| | | |
|---|---|---|
| CN | 1749287 A | 3/2006 |
| CN | 1788023 A | 6/2006 |
| CN | 1993390 A | 7/2007 |
| CN | 101175775 A | 5/2008 |
| CN | 101180320 A | 8/2008 |
| EP | 0088638 A2 | 9/1983 |
| EP | 0 101 893 A2 | 3/1984 |
| EP | 0241947 A2 | 10/1987 |
| EP | 0381364 A1 | 8/1990 |
| EP | 1 195 191 A1 | 4/2002 |
| EP | 1484343 A1 | 12/2004 |
| GB | 845655 A | 8/1960 |
| GB | 954078 | 4/1964 |
| GB | 1147273 A | 4/1969 |
| GB | 1233106 A | 5/1971 |
| GB | 1351 624 A | 5/1974 |
| GB | 1 587 891 A | 4/1981 |
| GB | 2 077 628 A | 12/1981 |
| JP | 46-11670 | 3/1971 |
| JP | 46-31969 | 9/1971 |
| JP | 47-42379 | 10/1972 |
| JP | 41-12916 | 7/1981 |
| JP | 58-201802 A | 11/1983 |
| JP | 56-216735 A | 12/1983 |
| JP | 59-42039 A | 3/1984 |
| JP | 59-21321 B2 | 5/1984 |
| JP | 59-126406 A | 7/1984 |
| JP | 2-233708 A | 9/1990 |
| JP | 6-76239 B2 | 9/1994 |
| JP | 2675919 B2 | 7/1997 |
| JP | 2000-302807 A | 10/2000 |
| JP | 2002-515516 A | 5/2002 |
| JP | 2002-520426 A | 7/2002 |
| JP | 2002-537420 A | 11/2002 |
| JP | 3352059 B2 | 12/2002 |
| JP | 2003-277412 A | 10/2003 |
| JP | 2006-502263 A | 1/2006 |
| SU | 1295183 A * | 3/1987 |
| WO | 93/24533 A1 | 12/1993 |
| WO | 99/59712 A1 | 11/1999 |
| WO | 02/40547 A1 | 5/2002 |
| WO | WO-2007/071527 A1 | 6/2007 |

OTHER PUBLICATIONS

Mathur, K. et al., "Spouted Beds", Academic Press, 1974, pp. 114-116 and pp. 279-280.

"Terminology Dictionary of Powder Technology, 2nd Edition", Editor Society of Power Technology, Nikkan Kogyo Shimbun-sha, 2000, p. 321.

"Perry's Chemical Engineers' Handbook", McGraw-Hill, 1997, pp. 12-75 and 12-76.

Search Report from Singapore Application No. SG 200809160-5 dated May 26, 2009.

Search Report from Singapore Application No. 200809158-9 dated Jun. 4, 2009.

Search Report from Singapore Application No. 200809157-1 dated Jun. 4, 2009.

Search Report from Singapore Application No. 200809159-7 dated Jun. 4, 2009.

Search Report from Singapore Application No. 200809161-3 dated Jun. 4, 2009.

Hattori et al., "Minimum spoutable gas flow rate in side-outlet spouted bed with inner draft-tube," Journal of Chemical Engineering of Japan, vol. 14, No. 6, Apr. 3, 1981, pp. 462-466.

Takeda et al., "Modified types of Spouted bed—With the gas outlet located in the side wall surrounding the annular dense bed," Kagaku Kogaku Ronbunshu 1, Kagaku Kogaku Kyokai, No. 2, 1975, pp. 149-154.

U.S. Office Action dated Jun. 15, 2010 for related U.S. Appl. No. 12/332,055.

Search Report issued Nov. 10, 2010, in Singapore Patent Application No. 201004966-6.

Office Action issued Dec. 7, 2010, in U.S. Appl. No. 12/332,065.

US Office Action issued on Mar. 11, 2011 in related application (U.S. Appl. No. 12/331,730).

Office Action issued Mar. 16, 2011, in copending U.S. Appl. No. 12/332,102.

Hatate et al. "Flow Characteristics of Draft Tube Spouted Bed and its Application", Journal of the Society of Powder Technology, vol. 34, No. 5, May 1997, pp. 343-360.

Ishikura et al., "Hydrodynamics of a Spouted Bed with a Porous Draft Tube", Kagaku Kougaku Ronbunshu, vol. 22, No. 3, 1996, pp. 615-621.

Ishikura et al., "Hydrodynamics of Modified Spouted Beds for Binary Mixtures of Particles—Effect of the Aeration Gas Flow Rate from Side Distributor", Fukuoka University Journal of Engineering, No. 58, Mar. 1997, pp. 155-165.

Ishikura, "Regime Map of Binary Particle Mixture in a Spout-Fluid Bed," Kagaku Kougaku Ronbunshu, vol. 19, No. 6, 1993, pp. 1189-1192.

Notice of Allowance dated Apr. 18, 2011 for U.S. Appl. No. 12/332,102.

Notice of Allowance dated Apr. 21, 2011 for U.S. Appl. No. 12/331,730.

Search Report dated Apr. 22, 2009 for Singapore Application No. 200809160-5.

Takenaka et al., "Fluidity characteristics of a spouted bed with a cylinder to cone-shaped perforated draft tubes," SCEJ 71st Annual Meeting, J123, 2006, 1 page.

Weickert et al., "New Reactor Concepts for the Gas-Phase Polymerization of Olefins," Chemie Ingenieur Technik, vol. 77, No. 8, 2005, pp. 977-978.

Yokokawa, "Fluidizing characteristics of fluidized bed and spouted bed, and their application", Journal of the Society of Powder Technology, vol. 21, No. 11, Nov. 1984, pp. 715-723.

Office Action issued May 6, 2011, in copending U.S. Appl. No. 12/332,065.
Search Reoprt issued Jun. 30, 2011, in Singapore Patent Application No. 201008798-9.
Notice of Allowance issued Oct. 20, 2011, in U.S. Appl. No. 13/116,479.
First Office Action issued Aug. 1, 2012, in Chinese Patent Application. No. 200810183727.2, with English translation.

First Office Action issued Aug. 3, 2012, in Chinese Patent Application No. 200610183724,9, with English translation.
First Office Action issued Jul. 21, 2012, in Chinese Patent Application No. 200810183734.2, with English translation.
Office Action issued Jul. 31, 2012. In Chinese Patent Appication No. 201010199913.2.

* cited by examiner

SPOUTED BED DEVICE, POLYOLEFIN PRODUCTION SYSTEM WITH SPOUTED BED DEVICE, AND POLYOLEFIN PRODUCTION PROCESS

This Nonprovisional application claims priority under 35 U.S.C. §119(a) on Patent Application No(s). 2007-320166 filed in Japan on Dec. 11, 2007, the entire contents of which are hereby incorporated by reference.

BACKGROUND OF THE INVENTION

1. Field of the Invention

The present invention relates to a spouted bed device, a polyolefin production system equipped with a spouted bed device, and a process for producing polyolefins such as polyethylene and polypropylene using such a device and system.

2. Related Background Art

A spouted bed has the advantage that all the particles, even relatively large particles several millimeters in size which require an excessively high gas velocity for fluidization in a fluidized bed, circulate and are thoroughly mixed. Various studies have been conducted on spouted bed devices of differing construction which utilize a spouted bed. As used herein, "spouted bed" refers to a state characterized by the circulatory movement of particles wherein, under the action of a gas introduced at a high velocity from a gas inlet orifice provided at the bottom end of a cylindrical vessel, there forms a spout (sometimes referred to below as the "spout portion") which has a dilute particle concentration near the center axis of the particle bed held within the vessel and in which particles flow upward together with the gas, and there also forms at the periphery of the spout an annular particle bed where particles fall in a moving bed state under the influence of gravity (see, for example, *Terminology Dictionary of Powder Technology*, 2nd Edition, edited by The Society of Powder Technology, Japan (The Nikkan Kogyo Shimbun, 2000), p. 321).

However, to make a spouted bed device commercially feasible, it is important that a stable spouted bed be fully sustained even with some fluctuation in the treatment conditions. For example, if a fluctuation in the velocity of the gas being introduced or the amount of particles held inside the device causes the spouted bed to become unstable, resulting in particles dropping down through the gas inlet orifice, operation of the device must be interrupted to recover the particles.

SUMMARY OF THE INVENTION

It is therefore an object of the present invention to provide a spouted bed device in which a spouted bed can be fully sustained even when fluctuations occur in the treatment conditions. Another object of the invention is to provide a polyolefin production system equipped with such a spouted bed device. A further object of the invention is to provide a polyolefin production process which uses such as spouted bed device.

The spouted bed device according to the present invention includes a vertically extending cylinder; a decreasing diameter member which is formed on the cylinder, has an inside diameter that decreases progressively downward, and has a gas inlet orifice at a bottom end thereof; and a tubular portion which extends downward from an edge of the gas inlet orifice.

In the spouted bed device of the invention, a spouted bed is formed within a treatment zone enclosed by a top surface of the decreasing diameter member and an inner wall of the cylinder above the decreasing diameter member. That is, by having a gas flow upward at a high velocity from a gas inlet orifice at the bottom end of the decreasing diameter member and enter a treatment zone which holds particles, a spouted bed is formed. As mentioned above, a spouted bed is composed of a spout and an annular particle bed. Part of the gas that has been blown in from the gas inlet orifice forms the spout and sweeps past the particle bed, and the remainder diffuses into the annular particle bed. By mutually contacting particles and a gas in this way, the particles can be subjected to drying treatment or a desired reaction can be induced within the spouted bed device.

In the spouted bed device of the present invention, because the gas is introduced into the treatment zone by passing through a tubular portion which extends downward from the edge of the gas inlet orifice, the upward flow of gas within the treatment zone stabilizes more fully than when such a tubular portion is not provided and the gas is introduced simply from the gas inlet orifice. As a result, even if the velocity of the gas introduced and the amount of particles within the treatment zone fluctuate to some degree, the flow state of the spouted bed can be fully sustained. Providing the above-mentioned tubular portion has the additional advantage that, even when particles start to fall down through the gas inlet orifice under the influence of gravity, those particles are pushed up by the gases entering from below and readily returned to the treatment zone.

The spouted bed device of the present invention preferably includes also a conical baffle of a first type which has an outside diameter that increases progressively downward, is closed at a top end thereof, and has a bottom end that is spaced apart from an inside wall of the cylinder, wherein the conical baffle of the first type is disposed at a position which is below and opposed to a bottom end of the tubular portion. The inventors have found that placing a conical baffle of the foregoing construction in such a position results in the formation of a more stable spouted bed. The main reason appears to be that this conical baffle acts as a flow straightener for the gas before it is fed to the treatment zone.

In the spouted bed device of the invention, an additional conical baffle of the above-described first type is preferably disposed above the gas inlet opening, and more preferably above the gas inlet opening and even above the powder level of the spouted bed that is formed within the spouted bed device. By disposing a second conical baffle of the first type in such a position, particles blown upward by the gas can be kept from scattering. That is, the conical baffle of the first type placed in this position acts as a deflector. Moreover, by placing this conical baffle of the first type even above the powder level of the spouted bed, compared with the placement of such a conical baffle below the powder level, the fluid state of the spouted bed can be further stabilized.

In a conventional spouted bed device, a constant freeboard zone must be secured in order to suppress particle scatter. However, in the spouted bed device according to the present invention, disposing a conical baffle of the first type above the gas inlet orifice enables the scattering of spouted particles to be suppressed. As a result, the freeboard zone can be shortened, making it possible to achieve a higher volume efficiency than in a fluidized bed-type device.

Also, in comparison with a fluidized bed, it is known that a spouted bed is able to achieve an excellent performance in terms of pressure loss and that mixing which somewhat approximates plug flow arises as a result of the circulatory motion of the particles. Therefore, the spouted bed device of the invention provides the advantage, compared with a fluidized bed device, of enabling a narrower particle residence time distribution to be achieved in the treatment zone. This is effective when carrying out, for example, a polymerization reaction on polyolefin particles in the treatment zone.

It is preferable for the conical baffle of the first type described above to have a cylindrical portion which extends downward from a peripheral edge at the bottom end thereof. The cylindrical portion of the conical baffle of the first type is believed to help stabilize gas flow. By employing this arrangement, a more stable spouted bed is formed in the treatment zone.

The above-mentioned tubular portion preferably has a partition which horizontally divides the tubular path therein. Moreover, the tubular portion preferably has also a bellmouth-shaped bottom end. By employing a tubular portion having a partition and/or a bellmouth-shaped bottom end, the pushing up effect on particles which begin to fall through the gas inlet orifice is enhanced, enabling a further reduction in the amount of particles which drop down.

The inventive spouted bed device may further include a cylindrical member which is disposed inside the tubular portion and at least one end of which is closed, wherein the tubular path up to the gas inlet orifice has an annulus defined by an outside wall of the cylindrical member and an inside wall of the tubular portion. By employing this arrangement, the horizontal cross-section of the tubular path can be given an annular shape, which has the following advantages compared with a case in which a tubular path of the same cross-sectional area and a circular cross-sectional shape is employed. First, compared with a tubular path of circular cross-section, the pushing up effect on particles which begin to fall through the gas inlet orifice improves, enabling a further reduction in the amount of particles which drop down. Moreover, this arrangement is effective when scaling up the inventive spouted bed device. That is, even when the gas inlet orifice is enlarged, if the flow path up to this point has an annular shape, the orifice interval can be made narrower than cases where the cross-sectional shape is circular, facilitating the formation of a stable spouted bed.

The spouted bed device of the present invention may further include a closed plate which closes a bottom end of the tubular portion; a gas inlet tube which has a tubular path that is narrower than the tubular path of the tubular portion and which is disposed so as to pass through the closing plate; and a conical baffle of a second type which has an outside diameter that increases progressively downward, is closed at a top end thereof, and has a bottom end that is spaced apart from an inside wall of the tubular portion. Here, the conical baffle of the second type is disposed immediately above a top end of the gas inlet line. With a spouted bed device of the foregoing arrangement, the second conical baffle functions as a particle fall-back preventing plate, thereby making it possible to fully prevent particles from falling down through the gas inlet orifice even when gas supply is stopped.

The spouted bed device of the present invention may have a plurality of combinations of the cylinder, the decreasing diameter member and the tubular portion. By employing such an arrangement, particle treatment with a plurality of spouted beds can be carried out. In this case, the arrangement may be one in which a spouted bed is formed in each treatment zone and the particles successively pass through these treatment zones. To reduce the footprint of the device, it is preferable to arrange the plurality of the above cylinder/decreasing diameter member/tubular portion combinations in a vertical direction. In this case, it is preferable for the particles to successively pass from upper treatment zones to lower treatment zones. By providing a plurality of spouted beds, the particle retention time distribution can be made sufficiently narrow. As mentioned above, a spouted bed differs from a conventional fluidized bed in that mixing which somewhat approximate plug flow arises. It is therefore possible to narrow the retention time distribution to a similar degree with a smaller number of stages than when a plurality of fluidized beds are used.

The polyolefin production process of the present invention involves carrying out olefin polymerization by using the above-described spouted bed device to form a spouted bed of polyolefin particles within the spouted bed device.

The polyolefin production system according to the present invention includes an olefin pre-reactor which polymerizes olefin in the presence of an olefin polymerization catalyst to form polyolefin particles, and the above-described spouted bed device which is connected as a subsequent stage to the olefin pre-reactor.

The polyolefin production process according to the present invention involves carrying out multistage olefin polymerization using the above-described polyolefin production system.

The present invention thus provides a spouted bed device which is able to fully sustain a spouted bed even when fluctuations in the treatment conditions occur. The invention also provides a polyolefin production system equipped with such a spouted bed device, and a polyolefin production process which employs such a spouted bed device.

Figure 3:
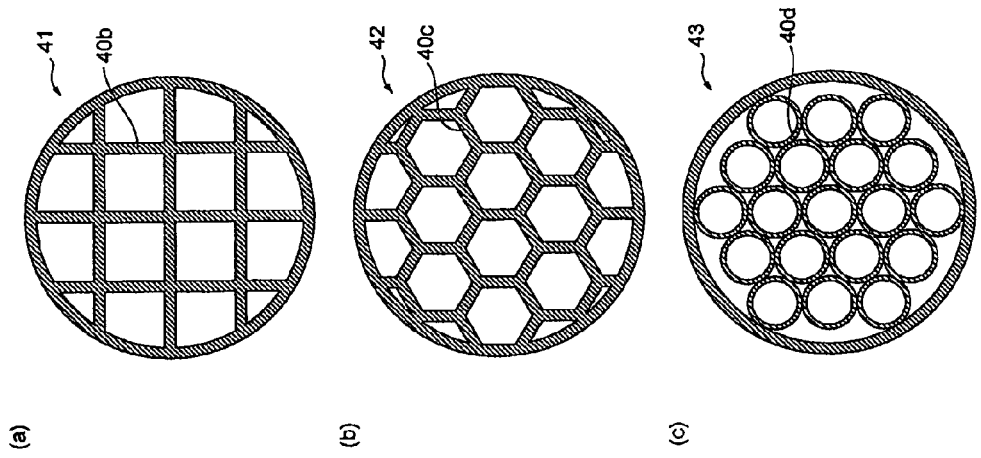
Figure 5:
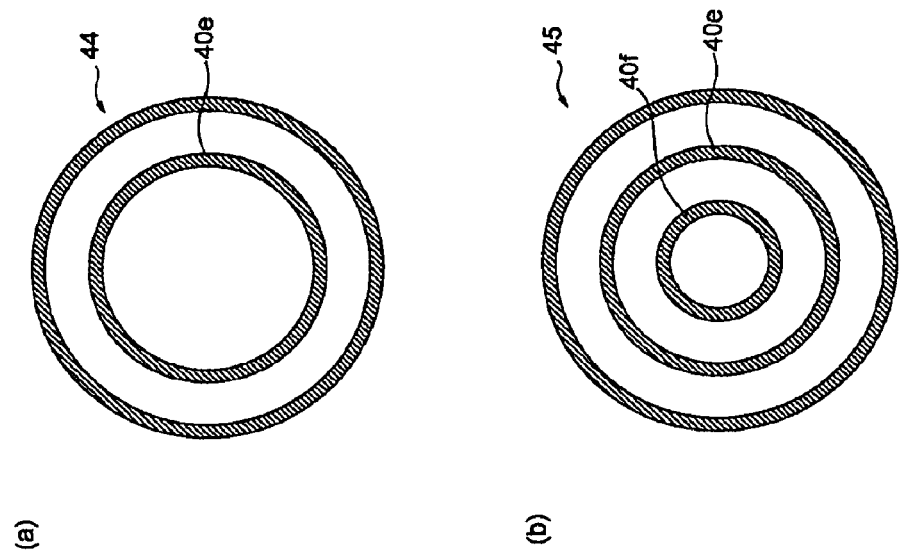
Figure 4:
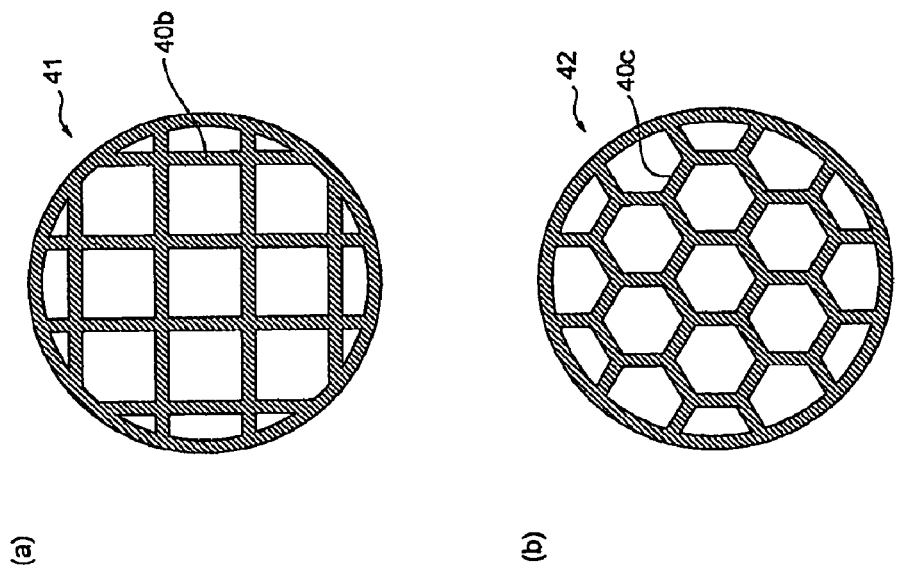
Figure 7:
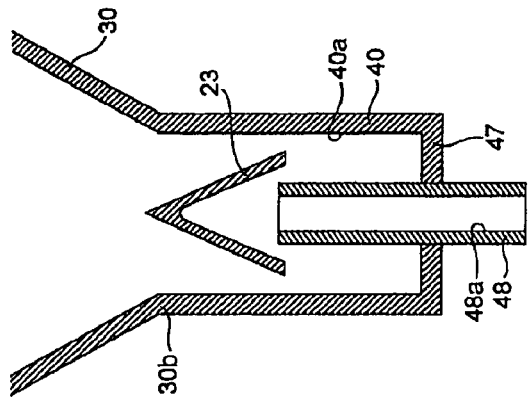
Figure 6:
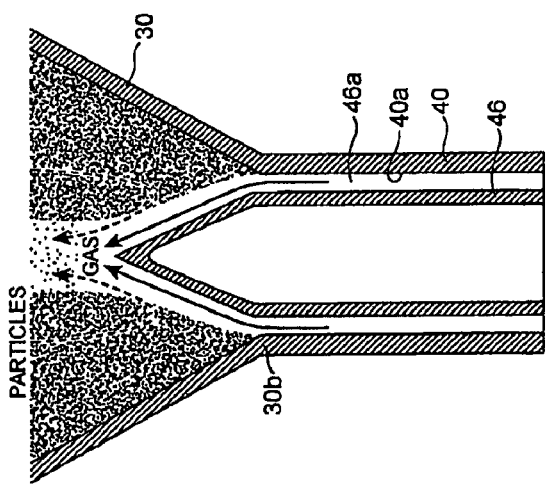
Figure 9:
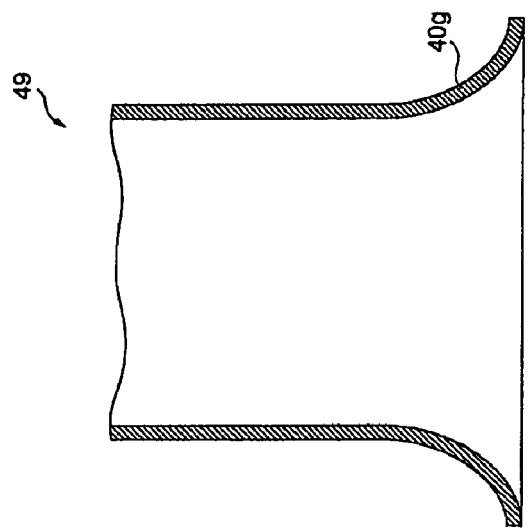
Figure 8:
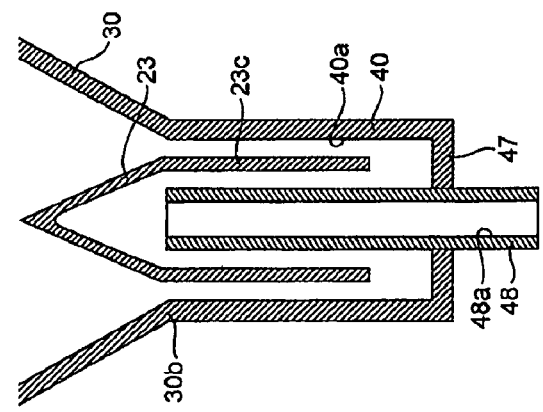
Figure 11:
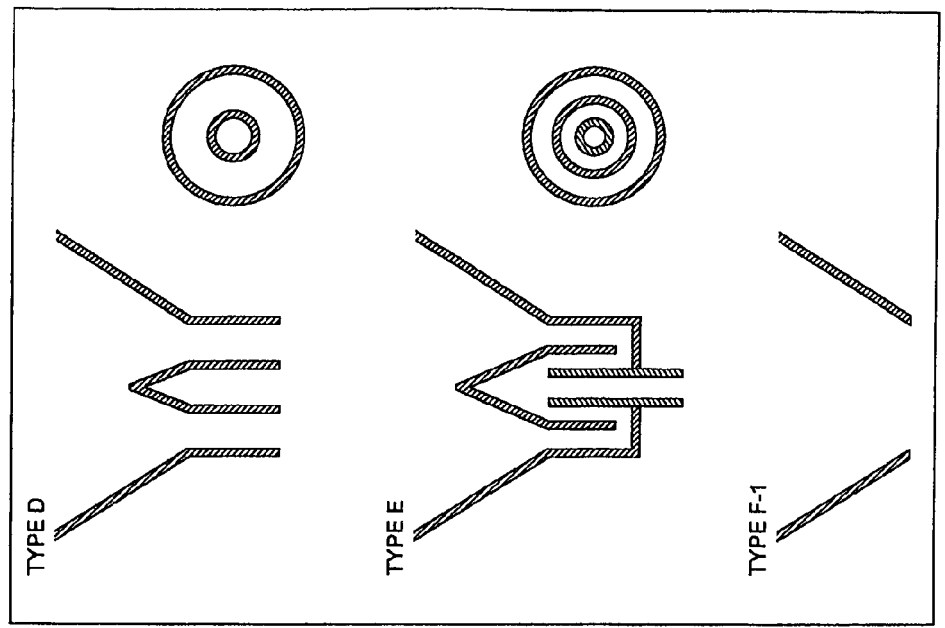
Figure 10:
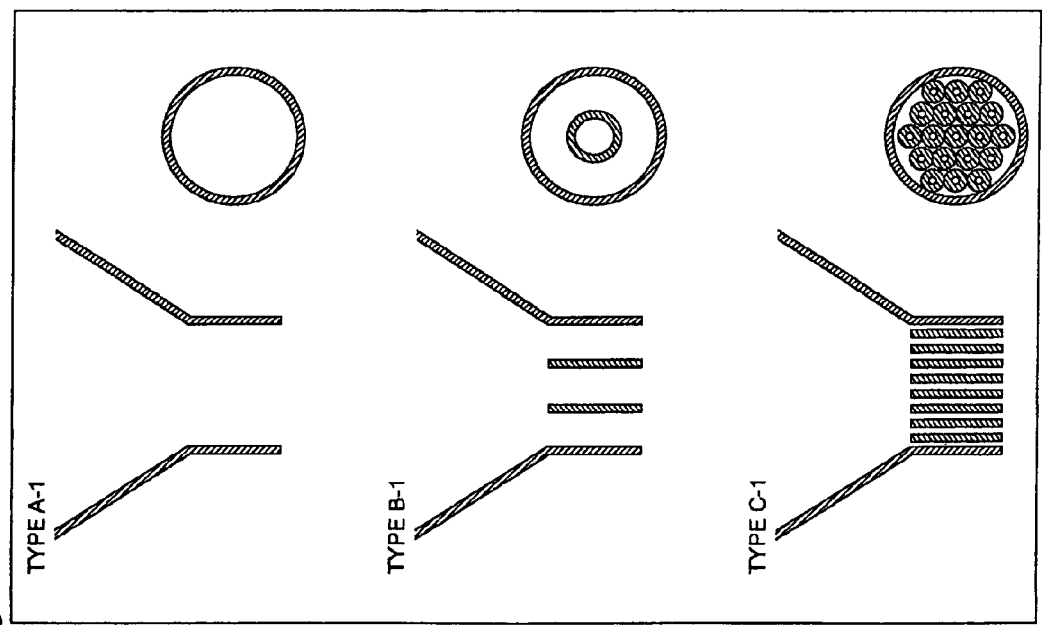

(a) of FIG. 3 to (c) of FIG. 3 show schematic cross-sectional diagrams of tubular portions of different shapes such as may be used in the spouted bed device according to the invention;

(a) of FIG. 4 and (b) of FIG. 4 show schematic cross-sectional diagrams of tubular portions of different shapes such as may be used in the spouted bed device according to the invention;

(a) of FIG. 5 and (b) of FIG. 5 show schematic cross-sectional diagrams of tubular portions of different shapes such as may be used in the spouted bed device according to the invention;

FIG. 6 is a schematic sectional diagram showing a tubular portion in which is disposed a cylindrical member;

FIG. 7 is a schematic sectional diagram showing a tubular portion in which are disposed a gas inlet tube and a second type of conical baffle;

FIG. 8 is a schematic sectional diagram showing a gas inlet tube and a second type of conical baffle disposed within a tubular portion;

FIG. 9 is a schematic sectional diagram showing an extension tube having a bellmouth-shaped bottom end;

FIG. 10 shows schematic diagrams of type A-1, B-1 and C-1 gas inlet portions in the spouted bed devices used in the examples of the invention described below; and FIG. 11 shows schematic diagrams of type D, E and F-1 gas inlet portions in the spouted bed devices used in the examples of the invention and the comparative examples described below.

DESCRIPTION OF THE PREFERRED EMBODIMENTS

Preferred embodiments of the invention are described in detail below while referring to the attached diagrams where necessary. Unless noted otherwise, positional relationships such as up-down and left-right are based on the relative positions shown in the diagrams. Relative dimensions of features shown in the diagrams may not be true to scale.

First Embodiment

Polyolefin Production System

Figure 1:
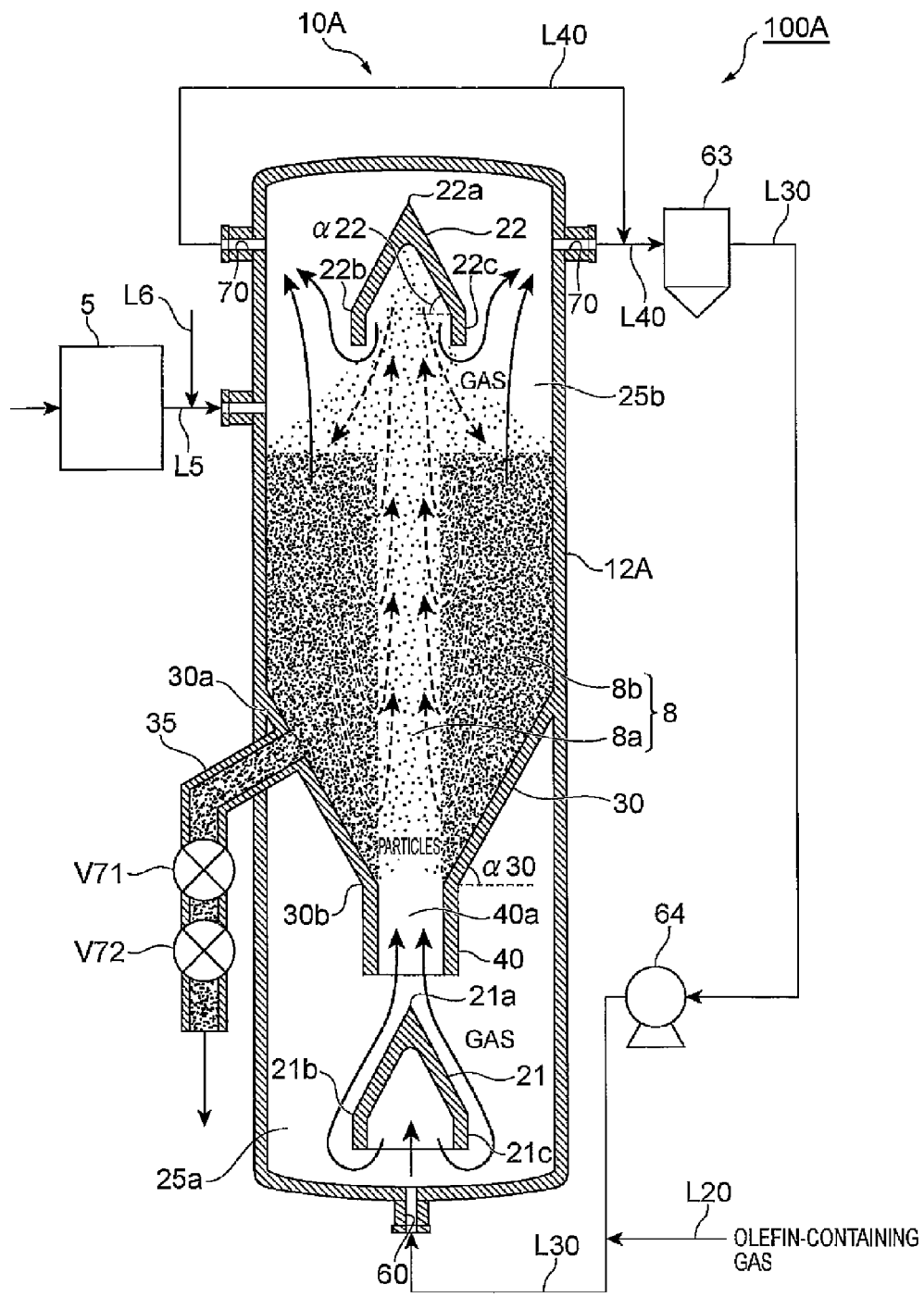
FIG. 1 is a simplified view of a first embodiment of the spouted bed device according to the present invention.

FIG. 1 shows a polyolefin production system 100A according to the present embodiment. This production system 100A includes an olefin prepolymerization reactor 5, and an olefin polymerization reactor 10A which is connected as a subsequent stage to the olefin prepolymerization reactor 5.

Olefin Prepolymerization Reactor

The olefin prepolymerization reactor 5 polymerizes olefin in the presence of an olefin polymerization catalyst to form polyolefin particles.

Examples of the olefin prepolymerization reactor 5 include, but are not limited to, slurry polymerization reactors, bulk polymerization reactors, stirred tank-type gas phase polymerization reactors, and fluidized bed-type gas phase polymerization reactors. Any one of these reactors may be used alone, a plurality of reactors of the same type may be used in combination, or two or more reactors of differing types may be used in combination.

Slurry polymerization reactors that may be used include known polymerization reactors, such as the stirred tank-type reactors and loop-type reactors described in Japanese Patent Publication No. S 41-12916, Japanese Patent Publication No. S 46-11670 and Japanese Patent Publication No. S 47-42379. Slurry polymerization is a process in which a polymerization solvent is prepared by adding an olefin monomer such as propylene or butene to an inert solvent such as an aliphatic hydrocarbon (e.g., propane, butane, isobutane, pentane, hexane, heptane, octane) or an alicyclic hydrocarbon (e.g., cyclopentane, cyclohexane), an olefin polymerization catalyst is dispersed in the polymerization solvent to form a slurry, and polymerization is carried out in a state where the polymer that is formed does not dissolve in the polymerization solvent. Polymerization is carried out at a temperature and pressure at which the polymerization solvent is maintained in a liquid state and the polymer that is formed does not dissolve in the polymerization solvent. The polymerization temperature is generally from 30 to 100° C., and preferably from 50 to 80° C. The polymerization pressure is generally from standard pressure to 10 MPaG, and preferably from 0.3 to 5 MPaG.

Bulk polymerization reactors that may be used include known polymerization reactors, such as the stirred tank-type reactors and loop-type reactors described in Japanese Patent Publication No. S 41-12916, Japanese Patent Publication No. S 46-11670 and Japanese Patent Publication No. S 47-42379. Bulk polymerization is a process in which an olefin monomer such as propylene or butene is used as the polymerization solvent in the substantial absence of inert solvents such as aliphatic hydrocarbons (e.g., propane, butane, isobutane, pentane, hexane, heptane, octane) and alicyclic hydrocarbons (e.g., cyclopentane, cyclohexane), an olefin polymerization catalyst is dispersed in the polymerization solvent, and polymerization is carried out in a state where the polymer that is formed does not dissolve in the polymerization solvent. Polymerization is carried out at a temperature and pressure at which the polymerization solvent is maintained in a liquid state and the polymer that is formed does not dissolve in the polymerization solvent. The polymerization temperature is generally from 30 to 100° C., and preferably from 50 to 80° C. The polymerization pressure is generally from standard pressure to 10 MPaG, and preferably from 0.5 to 5 MPaG.

Stirred tank-type gas phase polymerization reactors that may be used include known polymerization reactors, such as the reactors described in Japanese Patent Application Laid-open No. S 46-31969 and Japanese Patent Publication No. S 59-21321. Stirred tank-type gas phase polymerization is a process in which a monomer in a gaseous state is used as the medium and, while maintaining an olefin polymerization catalyst and olefin polymer in a fluidized state within the medium by means of an agitator, the monomer in the gaseous state is polymerized. The polymerization temperature is generally from 50 to 110° C., and preferably from 40 to 100° C. The polymerization pressure should be in a range at which the olefin can be present as a vapor phase within the stirred tank-type gas phase polymerization reactor, and is generally from standard pressure to 5 MPaG, and preferably from 0.5 to 3 MPaG.

Fluidized bed-type gas phase polymerization reactors that may be used include known reactors, such as the reactors described in Japanese Patent Application Laid-open No. S 58-201802, Japanese Patent Application Laid-open No. S 59-126406 and Japanese Patent Application Laid-open No. H 2-233708. Fluidized bed-type gas phase polymerization is a process in which a monomer in a gaseous state is used as the medium and, while maintaining primarily an olefin polymerization catalyst and olefin polymer in a fluidized state within the medium by the flow of the medium, the monomer in the gaseous state is polymerized. In some cases, an agitator is also provided to promote fluidization. The polymerization temperature is generally from 0 to 120° C., preferably from 20 to 100° C., and more preferably from 40 to 100° C. The polymerization pressure should be in a range at which the olefin can be present as a vapor phase within the fluidized bed-type reactor, and is generally from standard pressure to 10 MPaG, preferably from 0.2 to 8 MPaG, and more preferably from 0.5 to 5 MPaG.

Combinations of different reactors are exemplified by a slurry polymerization reactor or a bulk polymerization reactor, to which is connected, as the subsequent stage, a fluidized bed-type gas phase polymerization reactor or a stirred tank-type gas phase polymerization reactor.

Alternatively, a flushing tank for separating unreacted olefin or polymerization solvent from olefin polymer particles may generally be provided between a slurry polymerization reactor or a bulk polymerization reactor and, connected thereto as the subsequent stage, a gas phase polymerization reactor such as a fluidized bed-type gas phase polymerization reactor, a stirred tank-type gas phase polymerization reactor or the subsequently described olefin polymerization reactor 10A. However, it is not always essential to install a flushing tank between the bulk polymerization reactor and the gas phase polymerization reactor subsequent thereto.

Olefin Polymerization Reactor

The olefin polymerization reactor 10A is a reactor which carries out, in a substantially gas phase state, an olefin polymerization reaction on polyolefin particles formed by the olefin prepolymerization reactor 5.

The olefin polymerization reactor 10A shown in FIG. 1 is constructed so as to be capable of forming a single spouted bed 8. The reactor 10A is composed primarily of a cylinder 12A which extends vertically, two conical baffles 21 and 22 disposed within the cylinder 12A, a tubular baffle (decreasing diameter member) 30 provided in the cylinder 12A, and an extension tube (tubular portion) 40 connected to the bottom end of the tubular baffle 30. Preferably, the conical baffles 21 and 22, the tubular baffle 30 and the extension tube 40 are all disposed coaxially with the center axis of the cylinder 12A. From the standpoint of stabilizing the spouted bed, the cylinder 12A has an inside diameter of preferably not more than 5 m, and more preferably not more than 3.5 m.

The tubular baffle 30 is a tapered cylinder which is shaped so that the inside diameter decreases progressively downward, and which is contiguous at a top end 30a thereof with the inside wall of the cylinder 12A. This tubular baffle 30 is formed downward within the cylinder 12A, dividing the space within the cylinder 12A into two zones. That is, the tubular baffle 30 divides the space within the cylinder 12A into a bottom zone 25a below the tubular baffle 30 and a reaction zone 25b above the tubular baffle 30.

Olefin-containing gas flows upward from the bottom zone 25a, through the tubular path 40a in the extension tube 40, and into the reaction zone 25b at a high velocity. As shown in FIG. 1, this results in the formation of a spouted bed 8 of polyolefin particles. The spouted bed 8 is composed of a spout 8a and an annular particle bed 8b.

The extension tube 40 extends downward from the edge of the gas inlet orifice in the tubular baffle 30 and has a tubular path 40a therein, defined by the inner wall of the tube 40, which communicates with both the bottom zone 25a and the reaction zone 25b. A check valve (not shown) may be disposed along the extension tube 40 so as to keep polyolefin particles within the reaction zone 25b from flowing downward and out through the gas inlet orifice at such times as when the olefin polymerization reactor 10A is started up or temporarily shut down.

The conical baffles 21, 22 both have an outside diameter which increases progressively downward, are each closed at respective top ends 21a, 22a, and have respective bottom ends 21b, 22b which are spaced apart from the inner wall of the cylinder 12A. The outside surface of each of the conical baffles 21, 22 is of conical shape, and the interior is hollow. The inside walls of the conical baffles 21, 22 are formed as continuously curved surfaces and, as shown in FIG. 1, the peaks of the conical baffles 21, 22 are locally thick-walled. In this way, the conical baffles 21, 22 are constructed so as to have vertical cross-sections in the shape of circular arcs.

One conical baffle 21 (also referred to below as the "lower conical baffle") is disposed at a position within the bottom zone 25a which is below and opposite the bottom end of the extension tube 40, and serves to straighten the flow within the bottom zone 25a of olefin-containing gas which has entered through a gas feed nozzle 60 provided at the base of the olefin polymerization reactor 10A. The other conical baffle 22 (also referred to below as the "upper conical baffle") is disposed at a position which is above the tubular baffle 30 in the reaction zone 25b and opposite the gas inlet orifice therein, and serves to keep spouted polyolefin particles from scattering.

The lower and upper conical baffles 21 and 22 each have a cylindrical portion 21c, 22c which extends downward from a peripheral edge of the respective bottom ends 21b, 22b thereof. Because the lower conical baffle 21 has cylindrical portion 21c, the flow-straightening effect in the bottom zone 25a is further improved. As a result, olefin-containing gas which has been sufficiently flow-straightened is fed through the extension tube 40 into the reaction zone 25b, enabling further stabilization of the spouted bed 8. Stabilization of the spouted bed 8 is also achieved as a result of the upper conical baffle 22 having cylindrical portion 22c. This is presumably because placing an upper conical baffle 22 of the above construction within the reaction zone 25b stabilizes the flow of gas within the reaction zone 25b.

Gas discharge nozzles 70 are formed at the top of the cylinder 12A, thereby enabling the gas within the reaction zone 25b to be laterally discharged. Compared with an arrangement in which gas is discharged upward, the present arrangement in which gas is laterally discharged has the advantage of increasing the amount of gas that diffuses within the annular particle bed 8b portion of the spouted bed 8, thereby enhancing the solid-gas contacting efficiency.

To form a stable spouted bed 8 in the reaction zone 25, it is desirable that each tubular baffle 30 satisfy the following conditions. Namely, the ratio $d_A/d_B$ between the diameter $d_A$ of the gas inlet orifice at the bottom end 30b of the tubular baffle 30 (inside diameter of the extension tube 40) and the inside diameter $d_B$ of the cylinder 12A is preferably 0.35 or less.

Also, the angle of inclination $\alpha 30$ of the tubular baffle 30 in FIG. 1, i.e., the angle of the inside surface of the tubular baffle 30 with the horizontal, is preferably at least the angle of repose for polyolefin particles present within the cylinder 12A. The angle of inclination $\alpha 30$ is more preferably at least the angle of repose and at least the angle at which the polyolefin particles can be completely discharged gravitationally. In this way, smooth downward movement of the polyolefin particles is achieved.

Although a spouted bed can be formed using even a flat plate with a gas inlet orifice formed therein instead of a tubular baffle 30, a region where particles do not fluidize will arise on such a flat plate near the inside surface of the cylinder 12A. As a result, due to poor heat removal in this region, the particles may fuse together into a mass. To avoid such a situation, it is thus desirable for the tubular baffles 30 to have an angle of inclination $\alpha 30$ which, as noted above, is at least a given angle.

It is preferable for the upper conical baffle 22 in FIG. 1 to have an angle of inclination $\alpha 22$, i.e., the angle formed between the outside surface of the upper conical baffle 22 and the horizontal, which is at least the angle of repose for polyolefin particles present within the cylinder 12A. In this way, polyolefin particles can be adequately prevented from sticking to the upper conical baffle 22.

Polyolefin particles have an angle of repose of, for example, from about 35° to about 50°. The angles of inclination $\alpha 30$ and $\alpha 22$ are both preferably at least 55°.

The lower and upper conical baffles 21, 22 and the tubular baffle 30 are each attached to the cylinder 12A by supports (not shown). The supports have substantially no influence on gas flow and polyolefin flow. The cylinder 12A, deflectors 20 and tubular baffles 30 may be made of, for example, carbon steels and stainless steels such as "SUS 304" and "SUS 316L". As used herein, "SUS" refers to a stainless specification standardized by Japanese Industrial Standards (JIS). It is preferable to use "SUS 316L" when a catalyst which are high in corrosive ingredient (e.g., a halogen such as chlorine) is to be employed.

As shown in FIG. 1, an olefin-containing gas feed line L30 is connected to the gas feed nozzle 60 provided at the base of the cylinder 12A, and the olefin-containing gas is fed into the bottom zone 25a by means of a compressor 64 located on line L30. In addition to the gas feed nozzle 60, a discharge nozzle (not shown) which is capable of discharging polyolefin particles at the end of reactor operation may also be provided at the bottom of the cylinder 12A. Also, to reduce the amount of powder remaining inside the cylinder 12A at the end of reactor operation, it is preferable to provide an interior member in the shape of an inverted cone (not shown) at a position which does not interfere with gas flow at the bottom of the cylinder 12A.

A gas discharging line L40 which discharges gas from the reaction zone 25b is connected to the gas discharge nozzles 70 at the top of the cylinder 12A. The gas that has been discharged through the gas discharging line L40 has gas-entrained particles removed therefrom by an optionally provided cyclone 63, passes through a cooling means or the like (not shown), then is recycled by line L30. A line L20 for supplying an olefin-containing gas to line L30 from the exterior is connected to this line L30.

In addition, a line L5 is connected to a position which is higher than the zone where the spouted bed 8 is formed in the cylinder 12A, and polyolefin particles containing solid particles of an olefin polymerization catalyst are fed to the reaction zone 25b. A particle discharging tube 35 is connected to the tubular baffle 30, and polyolefin particles which have grown within the reaction zone 25b are discharged through the particle discharging tube 35. Two valves V71 and V72 are arranged in series on the particle discharging tube 35, enabling the polyolefin particles to be discharged in a subsequent step by successively opening and closing these valves V71 and V72.

Accordingly, in the present embodiment, a polymerization step which uses two reactors—the olefin prepolymerization reactor 5 and the olefin polymerization reactor 10A—is achieved. In this way, the olefin prepolymerization reactor 5 effects the polymerization and growth of polyolefin particles, creating relatively large polyolefin particles having a particle size of preferably at least 500 μm, more preferably at least 700 μm, and even more preferably at least 850 μm, thereby enabling the formation of a more stable spouted bed. However, it is also possible to have the polymerization step use a single reactor which does not include an olefin prepolymerization reactor 5. In this case, an olefin polymerization catalyst or prepolymerization catalyst is fed directly to the olefin polymerization reactor 10A, and olefin polymerization is carried out. Alternatively, one or more additional olefin polymerization reactor, such as an olefin prepolymerization reactor 5 or an olefin polymerization reactor 10A, may be provided subsequent to the olefin polymerization reactor 10A so as to achieve a polymerization step composed of three or more stages.

Olefin, Polyolefin and Catalyst

Next, the olefin, polyolefin, catalyst and other substances used in such a system are described.

In the olefin polymerization reactor, polyolefin production process and polyolefin production system of the invention, polyolefin—i.e., olefin polymer (olefin homopolymer, olefin copolymer)—production is carried out by the polymerization of one or more olefin (homopolymerization or copolymerization). Examples of olefins that may be used in this invention include ethylene, propylene, 1-butene, 1-pentene, 4-methyl-1-pentene, 5-methyl-1-hexene, 1-hexene, 1-heptene and 1-octene.

One or more of these olefins may be used. Alternatively, the olefin used may be changed in each polymerization step. In cases where polymerization is carried out as a multistage process, a different olefin may be used in each stage. When two or more olefins are used, examples of suitable olefin combinations that may be employed include propylene/ethylene, propylene/1-butene, propylene/ethylene/1-butene, ethylene/1-butene, ethylene/1-hexene and ethylene/1-octene. In addition to olefins, it is also possible to use at the same time various copolymeric ingredients such as dienes.

Olefin polymers (homopolymers, copolymers) such as propylene homopolymers, propylene/ethylene copolymers, propylene/1-butene copolymers and propylene/ethylene/1-butene copolymers may be advantageously produced in the present invention. The production of olefin polymers obtained by multistage polymerization in which the proportions of the monomer units serving as the polymer ingredients differ in the respective stages is especially preferred. For example, it is possible to form a multistage-polymerized olefin copolymer by feeding one type of olefin to an olefin prepolymerization reactor 5 and a multistage-type gas phase polymerization reactor 10A so as to form homopolymer particles, or copolymerizing the first olefin with a small amount of another olefin to form random copolymer particles, then feeding, in a subsequent stage, two or more types of olefin to these polymer particles in an additional olefin polymerization reactor such as an olefin prepolymerization reactor 5 or a multistage-type gas phase polymerization reactor 10A. This results in a narrow residence time distribution in the olefin polymerization reactor 10A, making it easy to achieve a fixed compositional ratio within the polymer particles. This approach is especially effective for reducing molding defects.

Examples of such polymers include propylene-propylene/ethylene polymers, propylene-propylene/ethylene-propylene/ethylene polymers, propylene/ethylene-propylene/ethylene polymers and propylene-propylene/ethylene/1-butene polymers. Here, a dash ("-") indicates the boundary between polymers, and a slash ("/") indicates that two or more olefins are copolymerized within the polymer. Of these, the production of multistage-polymerized propylene-based copolymers which are polymers having propylene-based monomer units, are called "high-impact polypropylene" (in Japan, also customarily called "polypropylene block copolymers"), and have crystalline propylene-based polymer segments and amorphous propylene-based polymer segments, is preferred. A multistage polymerized propylene-based copolymer can be prepared by the continuous multistage polymerization, in any order, of crystalline homopolypropylene segments or random copolymer segments obtained by copolymerizing a small amount of an olefin other than propylene, with amorphous rubber segments copolymerized from ethylene, propylene and, as an optional ingredient, an olefin other than ethylene and propylene, in the presence of the respective polymers. Such a copolymer has an intrinsic viscosity, as measured in 1,2,3,4-tetrahydronaphthalene at 135° C., which is preferably in a range of from 0.1 to 100 dl/g. This multistage polymerized polypropylene-based copolymer has excellent heat resistance, rigidity and impact resistance, and can therefore be used in automotive components such as bumpers and door trim, and in various packaging containers such as retortable food packaging containers.

Moreover, in the present embodiment, to broaden the molecular weight distribution of the olefin polymer, the olefin polymer components produced in respective polymerization steps may be given different molecular weights. The present invention is also advantageous for producing olefin polymers having a broad molecular weight distribution. For example, the intrinsic viscosity obtained by measurement as described above for the polymer component obtained in the polymerization step that produces the highest molecular weight polymer component is in a range of preferably from 0.5 to 100 dl/g, more preferably from 1 to 50 dl/g, and even more preferably from 2 to 20 dl/g. This intrinsic viscosity is at least five times the intrinsic viscosity of the polymer component obtained in the polymerization step that produces the lowest molecular weight polymer component. The present invention can advantageously produce an olefin polymer in which the amount of the polymer component obtained in the polymerization step which produces the highest molecular weight polymer component accounts for from 0.1 to 80 wt % of the olefin polymer.

The olefin polymerization catalyst used in the invention may be a known addition polymerization catalyst used in olefin polymerization. Illustrative examples include Ziegler-type solid catalysts formed by contacting a solid catalyst component containing titanium, magnesium, a halogen and an electron donor (referred to below as "catalyst component A") with an organoaluminum compound component and an electron donor component; and metallocene-type solid catalysts prepared by supporting a metallocene compound and a cocatalyst component on a granular carrier. Combinations of these catalysts may also be used.

What is commonly referred to as a titanium/magnesium composite catalyst may be used as catalyst component A employed in the preparation of a Ziegler-type solid catalyst. This composite catalyst may be obtained by contacting a titanium compound, a magnesium compound and an electron donor such as the following.

Titanium compounds that may be used to prepare catalyst component A are exemplified by titanium compounds having the general formula $Ti(OR^1)_aX_{4-a}$ (where $R^1$ is a hydrocarbon group of 1 to 20 carbons, X is a halogen atom, and the letter a is a number such that $0 \leq a \leq 4$). Illustrative examples include tetrahalogenated titanium compounds such as titanium tetrachloride; trihalogenated alkoxytitanium compounds such as ethoxytitanium trichloride and butoxytitanium trichloride; dihalogenated dialkoxytitanium compounds such as diethoxytitanium dichloride and dibutoxytitanium dichloride; monohalogenated trialkoxytitanium compounds such as triethoxytitanium chloride and tributoxytitanium chloride; and tetraalkoxytitanium compounds such as tetraethoxytitanium and tetrabutoxytitanium. These titanium compounds may be used singly or as combinations of two or more thereof.

Magnesium compounds that may be used to prepare catalyst component A are exemplified by magnesium compounds which have a magnesium-carbon bond or a magnesium-hydrogen bond and have a reducing ability, and magnesium compounds which lack a reducing ability. Illustrative examples of magnesium compounds which have a reducing ability include dialkylmagnesium compounds such as dimethylmagnesium, diethylmagnesium, dibutylmagnesium and butylethylmagnesium; alkylmagnesium halides such as butylmagnesium chloride; alkylalkoxymagnesium compounds such as butylethoxymagnesium; and alkylmagnesium hydrides such as butylmagnesium hydride. These magnesium compounds having a reducing ability may also be used in the form of a complex compound with an organoaluminum compound.

Illustrative examples of magnesium compounds which lack a reducing ability include dihalogenated magnesium compounds such as magnesium dichloride; alkoxymagnesium halides such as methoxymagnesium chloride, ethoxymagnesium chloride and butoxymagnesium chloride; dialkoxymagnesium compounds such as diethoxymagnesium and dibutoxymagnesium; and magnesium carboxylates such as magnesium laurate and magnesium stearate. These magnesium compounds which lack a reducing ability may be compounds which are synthesized, either in advance or at the time of catalyst component A preparation, by a known method from a magnesium compound having a reducing ability.

Electron donors that may be used to prepare catalyst component A include oxygen-containing electron donors such as alcohols, phenols, ketones, aldehydes, carboxylic acids, esters of organic or inorganic acids, ethers, acid amides and acid anhydrides; nitrogen-containing electron donors such as ammonia, amines, nitriles and isocyanates; and organic acid halides. Of these electron donors, the use of inorganic acid esters, organic acid esters and ethers is preferred.

Preferred inorganic acid esters include silicon compounds having the general formula $R^2_nSi(OR^3)_{4-n}$, (where $R^2$ is a hydrocarbon group of 1 to 20 carbons or a hydrogen atom, $R^3$ is a hydrocarbon group of 1 to 20 carbons, and the letter n is a number such that $0 \leq n \leq 4$). Illustrative examples include tetraalkoxysilanes such as tetramethoxysilane, tetraethoxysilane and tetrabutoxysilane; alkyltrialkoxysilanes such as methyltrimethoxysilane, ethyltrimethoxysilane, butyltrimethoxysilane, isobutyltrimethoxysilane, t-butyltrimethoxysilane, methyltriethoxysilane, ethyltriethoxysilane, butyltriethoxysilane, isobutyltriethoxysilane and t-butyltriethoxysilane; and dialkyldialkoxysilanes such as dimethyldimethoxysilane, diethyldimethoxsilane, dibutyldimethoxysilane, diisobutyldimethoxysilane, di-t-butyldimethoxysilane, butylmethyldimethoxysilane, butylethyldimethoxysilane, t-butylmethyldimethoxysilane, dimethyldiethoxysilane, diethyldiethoxysilane, dibutyldiethoxysilane, diisobutyldiethoxysilane, di-t-butyldiethoxysilane, butylmethyldiethoxysilane, butylethyldiethoxysilane and t-butylmethyldiethoxysilane.

Preferred organic acid esters include monofunctional and polyfunctional carboxylic acid esters, such as aliphatic carboxylic acid esters, alicyclic carboxylic acid esters and aromatic carboxylic acid esters. Illustrative examples include methyl acetate, ethyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, diethyl phthalate, di-n-butyl phthalate and diisobutyl phthalate. Preferred examples include unsaturated aliphatic carboxylic acid esters such as methacrylic acid esters, and phthalic acid esters such as maleic acid esters. Phthalic acid diesters are more preferred.

Illustrative examples of ethers include dialkyl ethers such as diethyl ether, dibutyl ether, diisobutyl ether, diamyl ether, diisoamyl ether, methyl butyl ether, methyl isoamyl ether and ethyl isobutyl ether. Preferred examples include dibutyl ether and diisoamyl ether.

Illustrative examples of organic acid halides include mono- and polyfunctional carboxylic acid halides, such as aliphatic carboxylic acid halides, alicyclic carboxylic acid halides and aromatic carboxylic acid halides. Illustrative examples include acetyl chloride, propionyl chloride, butyryl chloride, valeroyl chloride, acryloyl chloride, methacryloyl chloride, benzoyl chloride, toluoyl chloride, anisoyl chloride, succinyl chloride, malonyl chloride, maleyl chloride, itaconyl chloride and phthaloyl chloride. Preferred examples include aromatic carboxylic acid chlorides such as benzoyl chloride, toluoyl chloride and phthaloyl chloride. Phthaloyl chloride is especially preferred.

Examples of methods for preparing catalyst component A include the following.

(1) Reacting a liquid magnesium compound, or a complex compound of a magnesium compound and an electron donor, with a precipitating agent, then treating with a titanium compound or with a titanium compound and an electron donor.

(2) Treating a solid magnesium compound, or a complex compound of a solid magnesium compound and an electron donor, with a titanium compound or with a titanium compound and an electron donor.

(3) Reacting a liquid magnesium compound with a liquid titanium compound in the presence of an electron donor, and inducing the precipitation of a solid titanium complex.

(4) Further treating the reaction product obtained in method (1), (2) or (3) above with a titanium compound, or with an electron donor and a titanium compound.

(5) A method in which a solid product obtained by reducing an alkoxytitanium compound with an organomagnesium compound such as a Grignard reagent in the presence of an organosilicon compound having a Si—O bond is treated with an ester compound, an ether compound and titanium tetrachloride.

(6) A method in which a solid product obtained by reducing a titanium compound with an organomagnesium compound in the presence of an organosilicon compound or an organosilicon compound and an ester compound is treated by adding, in order, a mixture of an ether compound and titanium tetrachloride, followed by an organic acid halide compound, and the treated solid is subsequently treated with a mixture of an ether compound and titanium tetrachloride or a mixture of an ether compound, titanium tetrachloride and an ester compound.

(7) A method in which the product of the contact catalysis of a metal oxide, dihydrocarvyl magnesium and a halogen-containing alcohol is contacted with an electron donor and a titanium compound, either following treatment with a halogenating agent or without such treatment.

(8) A method in which a magnesium compound such as the magnesium salt of an organic acid or an alkoxymagnesium is contacted with an electron donor and a titanium compound, either following treatment with a halogenating agent or without such treatment.

(9) Treating the compound obtained in any of methods (1) to (8) above with a halogen, a halogen compound or an aromatic hydrocarbon.

Of the above methods for preparing catalyst component A, methods (1) to (6) are preferred. These methods of preparation are generally all carried out in an inert gas atmosphere, such as nitrogen or argon.

In the preparation of catalyst component A, the titanium compound, organosilicon compound and ester compound are preferably used after dissolution or dilution in a suitable solvent. Illustrative examples of such solvents include aliphatic hydrocarbons such as hexane, heptane, octane and decane; aromatic hydrocarbons such as toluene and xylene; alicyclic hydrocarbons such as cyclohexane, methylcyclohexane and decalin; and ether compounds such as diethyl ether, dibutyl ether, diisoamyl ether and tetrahydrofuran.

In the preparation of catalyst component A, the temperature of the reducing reaction which uses an organomagnesium compound is generally from −50 to +70° C. From the standpoint of catalyst activity and cost, the temperature is preferably from −30 to +50° C., and more preferably from −25 to +35° C. The dropwise addition time for the organomagnesium compound, while not subject to any particular limitation, is generally from about 30 minutes to about 12 hours. Following completion of the reducing reaction, subsequent reactions may be carried out at a temperature of from 20 to 120° C.

In the preparation of catalyst component A, the reducing reaction may be carried out in the presence of a porous material such as an inorganic oxide or an organic polymer so as to allow the solid product to impregnate into the porous material. Such porous materials preferably have a pore volume at a pore radius of from 20 to 200 nm of at least 0.3 ml/g and an average particle size of from 5 to 300 μm. Examples of porous inorganic oxides include $SiO_2$, $Al_2O_3$, MgO, $TiO_2$, $ZrO_2$ and composite oxides thereof. Examples of porous polymers include polystyrene-based porous polymers such as polystyrene and styrene-divinylbenzene copolymers; polyacrylate-based porous polymers such as polyethyl acrylate, methyl acrylate-divinyl benzene copolymers, polymethyl methacrylate and methyl methacrylate-divinylbenzene copolymers; and polyolefin-based porous polymers such as polyethylene, ethylene-methyl acrylate copolymers and polypropylene. Of these porous substances, $SiO_2$, $Al_2O_3$ and styrene-divinylbenzene copolymers are preferred.

The organoaluminum compound component used in the preparation of a Ziegler solid catalyst has at least one aluminum-carbon bond on the molecule and may typically have one of the following general formulas.

$$R^4{}_mAlY_{3-m}$$

$$R^5R^6Al{-}O{-}AlR^7R^8$$

In the above formulas, $R^4$ to $R^8$ are each hydrocarbon groups having from 1 to 8 carbons, and Y is a halogen atom, hydrogen or an alkoxy group. $R^4$ to $R^8$ may each be the same or different. Also, the letter m is a number such that $2 \leq m \leq 3$.

Illustrative examples of the organoaluminum compound component include trialkylaluminums such as triethylaluminum and triisobutylaluminum; dialkylaluminum hydrides such as diethylaluminum hydride and diisobutylaluminum hydride; dialkylaluminum halides such as diethylaluminum chloride and diisobutylaluminum chloride; mixtures of a trialkylaluminum with a dialkylaluminum halide, such as a mixture of triethylaluminum with diethylaluminum chloride; and alkylalumoxanes such as tetraethyldialumoxane and tetrabutyldialumoxane. Of these organoaluminum compounds, the use of a trialkylaluminum, a mixture of a trialkylaluminum with a dialkylaluminum halide, or an alkylalumoxane is preferred. The use of triethylaluminum, triisobutylaluminum, a mixture of triethylaluminum and diethylaluminum chloride, or tetraethyldialumoxane is more preferred.

Examples of the electron donor component used in the preparation of a Ziegler solid catalyst include the following commonly used electron donors: oxygen-containing electron donors such as alcohols, phenols, ketones, aldehydes, carboxylic acids, the esters of organic or inorganic acids, ethers, acid amides and acid anhydrides; and nitrogen-containing electron donors such as ammonia, amines, nitriles and isocyanates. Of these electron donor components, inorganic acid esters and ethers are preferred.

Preferred inorganic acid esters include silicon compounds of the general formula $R^9{}_nSi(OR^{10})_{4-n}$ (where $R^9$ is a hydrocarbon group of 1 to 20 carbons or a hydrogen atom, $R^{10}$ is a hydrocarbon group of 1 to 20 carbons, and the letter n is such that $0 \leq n \leq 4$). Illustrative examples include tetrabutoxysilane, butyltrimethoxysilane, tert-butyl-n-propyldimethoxysilane, dicyclopentyldimethoxysilane and cyclohexylethyldimethoxysilane.

Preferred ethers include dialkyl ethers, and diether compounds of the general formula

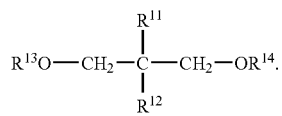

In the above formula, $R^{11}$ to $R^{14}$ are each independently a linear or branched alkyl, alicyclic hydrocarbon, aryl or aralkyl group of 1 to 20 carbons, although $R^{11}$ or $R^{12}$ may be a hydrogen atom. Illustrative examples include dibutyl ether, diamyl ether, 2,2-diisobutyl-1,3-dimethoxypropane and 2,2-dicyclopentyl-1,3-dimethoxypropane.

Of these electron donor components, an organosilicon compound of the general formula $R^{15}R^{16}Si(OR^{17})_2$ is especially preferred. Here, $R^{15}$ is a hydrocarbon group of 3 to 20 carbons in which the carbon atoms neighboring the silicon are secondary or tertiary. Illustrative examples include branched chain alkyl groups such as isopropyl, sec-butyl, tert-butyl and tert-amyl; cycloalkyl groups such as cyclopentyl and cyclohexyl; cycloalkenyl groups such as cyclopentenyl; and aryl groups such as phenyl and tolyl. In this formula, $R^{16}$ is a hydrocarbon group of 1 to 20 carbons, illustrative examples of which include straight chain alkyl groups such as methyl, ethyl, propyl, butyl and pentyl; branched alkyl groups such as isopropyl, sec-butyl, tert-butyl and tert-amyl; cycloalkyl groups such as cyclopentyl and cyclohexyl; cycloalkenyl groups such as cyclopentenyl; and aryl groups such as phenyl and tolyl. Also, in the above formula, $R^{17}$ is a hydrocarbon group of 1 to 20 carbons, and is preferably a hydrocarbon group of 1 to 5 carbons. Illustrative examples of organosilicon compounds that may be used as such electron donor components include tert-butyl-n-propyldimethoxysilane, dicyclopentyldimethoxysilane and cyclohexylethyldimethoxysilane.

In the preparation of a Ziegler solid catalyst, the organoaluminum compound component is used in an amount, per mole of titanium atoms in catalyst component A, of generally from 1 to 1,000 moles, and preferably from 5 to 800 moles. The electron donor component is used in an amount, per mole of titanium atoms in catalyst component A, of generally from 0.1 to 2,000 moles, preferably from 0.3 to 1,000 moles, and more preferably from 0.5 to 800 moles.

Catalyst component A, the organoaluminum compound component and the electron donor component may be brought into mutual contact before being fed to the multistage polymerization reactor, or may be separately fed to the multistage polymerization reactor, then contacted within the reactor. Alternatively, any two of these components may first be contacted with each other, and the remaining component subsequently brought into contact, or the respective components may be brought into mutual contact in a plurality of divided portions.

Examples of metallocene compounds that may be used to prepare the metallocene-type solid catalyst include transition metal compounds of the following general formula.

$$L_xM$$

In the formula, M is a transition metal, x is a number which satisfies the atomic valence of the transition metal M, and L is a ligand attached to the transition metal. At least one occurrence of L is a ligand having a cyclopentadienyl skeleton.

The transition metal M is preferably an atom from groups 3 to 6 of the Periodic Table of the Elements (IUPAC, 1989), and more preferably titanium, zirconium or hafnium.

Ligands L having a cyclopentadienyl skeleton are exemplified by (substituted) cyclopentadienyl groups, (substituted) indenyl groups and (substituted) fluorenyl groups. Illustrative examples include cyclopentadienyl, methylcyclopentadienyl, tert-butylcyclopentadienyl, dimethylcyclopentadienyl, tert-butylmethylcyclopentadienyl, methylisopropylcyclopentadienyl, trimethylcyclopentadienyl, tetramethylcyclopentadienyl, pentamethylcyclopentadienyl, indenyl, 4,5,6,7-tetrahydroindenyl, 2-methylindenyl, 3-methylindenyl, 4-methylindenyl, 5-methylindenyl, 6-methylindenyl, 7-methylindenyl, 2-tert-butylindenyl, 3-tert-butylindenyl, 4-tert-butylindenyl, 5-tert-butylindenyl, 6-tert-butylindenyl, 7-tert-butylindenyl, 2,3-dimethylindenyl, 4,7-dimethylindenyl, 2,4,7-trimethylindenyl, 2-methyl-4-isopropylindenyl, 4,5-benzindenyl, 2-methyl-4,5-benzindenyl, 4-phenylindenyl, 2-methyl-5-phenylindenyl, 2-methyl-4-phenylindenyl, 2-methyl-4-naphthylindenyl, fluorenyl, 2,7-dimethylfluorenyl, 2,7-di-tert-butylfluorenyl and substituted versions of the above. In cases where there are a plurality of ligands having a cyclopentadienyl skeleton, these ligands may be mutually like or unlike.

Ligands L other than those having a cyclopentadienyl skeleton are exemplified by heteroatom-bearing groups, halogen atoms and hydrocarbon groups (excluding groups having a cyclopentadiene-type anion skeleton).

Examples of the heteroatom in the heteroatom-bearing group include oxygen, sulfur, nitrogen and phosphorus atoms. Such groups are exemplified by alkoxy groups, aryloxy groups, thioalkoxy groups, thioaryloxy groups, alkylamino groups, arylamino groups, alkylphosphino groups, arylphosphino groups, and aromatic or aliphatic heterocyclic groups having on the ring at least one atom selected from among oxygen, sulfur, nitrogen and phosphorus atoms. Illustrative examples of the halogen atoms include fluorine, chlorine, bromine and iodine atoms. The hydrocarbon groups are exemplified by alkyl, aralkyl, aryl and alkenyl groups.

Two or more ligands L may be directly linked to each other or may be linked through a residue containing at least one type of atom selected from among carbon, silicon, nitrogen, oxygen, sulfur and phosphorus atoms. Illustrative examples of such residues include alkylene groups such as methylene, ethylene and propylene; substituted alkylene groups such as dimethylmethylene (isopropylidene) and diphenylmethylene; silylene groups; substituted silylene groups such as dimethylsilylene, diethylsilylene, diphenylsilylene, tetramethyldisilylene and dimethoxysilylene; and heteroatoms such as nitrogen, oxygen, sulfur and phosphorus. Of these, methylene, ethylene, dimethylmethylene (isopropylidene), diphenylmethylene, dimethylsilylene, diethylsilylene, diphenylsilylene and dimethoxysilylene are especially preferred.

Illustrative examples of metallocene compounds include bis(cyclopentadienyl)zirconium dichloride, bis(methylcyclopentadienyl)zirconium dichloride, bis(indenyl)zirconium dichloride, bis(4,5,6,7-tetrahydroindenyl)zirconium dichloride, ethylenebis(indenyl)zirconium dichloride, dimethylsilylenebis(trimethylcyclopentadienyl)zirconium dichloride, dimethylsilylenebis(indenyl)zirconium dichloride and dimethylsilyl(tetramethylcyclopentadienyl)(3,5-di-tert-butyl-2-phenoxy) titanium dichloride. Additional examples include compounds in which the dichloride has been substituted with dimethoxide or diphenoxide groups.

Cocatalyst components that may be used in the preparation of metallocene-type solid catalysts include organoaluminumoxy compounds, organoaluminum compounds and boron compounds.

Illustrative examples of the organoaluminumoxy compounds include tetramethyldialuminoxane, tetraethyldialuminoxane, tetrabutyldialuminoxane, tetrahexyldialuminoxane, methylaluminoxane, ethylaluminoxane, butylaluminoxane and hexylaluminoxane.

Illustrative examples of organoaluminum compounds include trimethylaluminum, triethylaluminum, tri-n-butylaluminum, triisobutylaluminum and tri-n-hexylaluminum.

Illustrative examples of boron compounds include tris(pentafluorophenyl)borane, triphenylcarbenium tetrakis(pentafluorophenyl)borate, tri(n-butyl)ammonium tetrakis(pentafluorophenyl)borate and N,N-dimethylanilinium tetrakis(pentafluorophenyl)borate.

The granular carrier that may be used in the preparation of metallocene solid catalysts is preferably a porous substance, illustrative examples of which include inorganic oxides such as $SiO_2$, $Al_2O_3$, MgO, $ZrO_2$, $TiO_2$, $B_2O_3$, CaO, ZnO, BaO and $ThO_2$; clays or clayey minerals such as smectite, montmorillonite, hectorite, laponite and saponite; and organic polymers such as polyethylene, polypropylene and styrene-divinyl benzene copolymer.

Metallocene-type solid catalysts that may be used include those mentioned in, for example, Japanese Patent Application Laid-open No. S 60-35006, Japanese Patent Application Laid-open No. S 60-35007, Japanese Patent Application Laid-open No. S 60-35008, Japanese Patent Application Laid-open No. S 61-108610, Japanese Patent Application Laid-open No. S 61-276805, Japanese Patent Application Laid-open No. S 61-296008, Japanese Patent Application Laid-open No. S 63-89505, Japanese Patent Application Laid-open No. H 3-234709, Japanese Translation of PCT Application No. H 5-502906, Japanese Patent Application Laid-open No. H 6-336502 and Japanese Patent Application Laid-open No. H 7-224106.

When a metallocene-type solid catalyst is used in olefin polymerization, a cocatalyst component such as an organoaluminum compound or a boron compound may be used together if necessary. In such cases, the metallocene-type solid catalyst and the cocatalyst component may be brought into mutual contact prior to being fed into the polymerization reactor, or may be separately fed into the polymerization reactor and contacted within the reactor. Alternatively, the respective components may be brought into mutual contact in a plurality of divided portions.

The mass mean particle diameter of the above olefin polymerization catalyst is generally from 5 to 150 μM. In a gas phase polymerization reactor in particular, to suppress the scattering of particles to the reactor exterior, it is desirable to use a catalyst having a mass mean particle diameter of preferably at least 10 μm, and more preferably at least 15 μm. The polymerization catalyst in the present embodiment may include additives such as a fluidization aid and an antistatic additive. Together with the polymerization catalyst of the present embodiment, concomitant use may also be made of a chain transfer agent such as hydrogen for the purpose of regulating the molecular weight of the polymer.

The olefin polymerization catalyst may be a so-called prepolymerization catalyst which first induces polymerization in a small amount of olefin. Examples of olefins that may be used in prepolymerization include the olefins that may be used in the above-described polymerization. In this case, a single type of olefin may be used alone, or two or more different olefins may be used together.

Methods for producing the prepolymerization catalyst include, but are not limited to, slurry polymerization and gas phase polymerization. Of these, slurry polymerization is preferred. The use of the latter in production is sometimes economically advantageous. Production may be carried out using a batch system, a semibatch-type system or a continuous system.

The mass mean particle diameter of the prepolymerization catalyst is generally from 5 to 1,000 μm. In a gas phase polymerization reactor in particular, to minimize scatter to the exterior of the reactor, the mass mean particle diameter is preferably at least 10 and more preferably at least 15 μm. Moreover, it is desirable for the amount of prepolymerization catalyst having a particle diameter of less than 20 μm, and especially less than 10 μm, to be low.

The polymerization catalyst may be introduced into the reactor as a suspension in a hydrocarbon solvent or the like. Introduction by entrainment with monomer gas or an inert gas such as nitrogen is also possible.

Polyolefin Production Process

Next, the process of producing a polyolefin using the production system 100A of the present embodiment is described.

First, polyolefin particles containing a catalyst component having polymerization activity are formed in the olefin prepolymerization reactor 5 using an olefin polymerization catalyst obtained by a known method.

Separately from the above, in the olefin polymerization reactor 10A, an olefin-containing gas is fed via line L30 into the cylinder 12A and the pressure is raised to the polymerization pressure, in addition to which the interior of the cylinder 12A is heated. The polymerization pressure, which may be any pressure within a range at which the olefin is capable of being present in the reactor as a gas phase, is generally from standard pressure to 10 MPaG, preferably from 0.2 to 8 MPaG, and more preferably from 0.5 to 5 MPaG. At a polymerization pressure below standard pressure, the productivity may decrease. On the other hand, at a reaction pressure above 10 MPaG, equipment costs for the reactor may become high. The polymerization temperature varies according to the type of monomer, the molecular weight of the product and other factors, although a temperature below the melting point of the olefin polymer, and preferably at least 10° C. lower than the melting point, is desirable. Specifically, the temperature is preferably from 0 to 120° C., more preferably from 20 to 100° C., and even more preferably from 40 to 100° C. It is preferable to carry out polymerization in an environment which is substantially free of moisture. The presence of moisture may lower the polymerization activity of the polymerization catalyst. Also, the presence of excess oxygen, carbon monoxide or carbon dioxide within the polymerization reaction system may lower the polymerization activity.

Next, polyolefin particles having a particle diameter of from about 0.5 mm to about 5.0 mm which have been obtained separately by a known method are fed to the cylinder 12A through a feed line L6 connected to line L5. The polyolefin particles fed into the cylinder 12A are most often particles which do not contain a catalyst component having a polymerization activity, although the presence within the particles of a catalyst component having a polymerization activity is acceptable.

When polyolefin particles are fed into the cylinder 12A through feed line L6 while feeding an olefin-containing gas into the reaction zone 25b through line L30, as shown in FIG. 1, a spouted bed 8 of polyolefin particles is formed within the reaction zone 25b. That is, under the action of the gas from the gas inlet orifice, the particle concentration thins near the center axis of the cylinder 12A in the reaction zone 25b and a spout 8a is formed in which particles flow upward together with the gas. Meanwhile, an annular particle bed 8b in which particles fall in the manner of a moving bed under the influence of gravity is formed at the periphery thereof, giving rise to the circulatory movement of particles within the reaction zone 25b.

Once the spouted bed 8 has been formed within the reaction zone 25b, the polyolefin particles containing a catalyst component having a polymerization activity that were formed in the olefin prepolymerization reactor 5 are fed from line L5 into the cylinder 12A at a constant rate per unit time, thereby commencing steady-state operation of the olefin polymerization reactor 10A.

Meanwhile, part of the olefin monomer-containing gas forms a spout 8a and sweeps past the particle bed, while the remainder of the gas diffuses into the annular particle bed 8b. In this way, the olefin-containing gas and the polyolefin particles containing a catalyst component having a polymerization activity undergo solid-gas contact and the action of the catalyst within the polyolefin particles causes the olefin polymerization reaction to proceed, resulting in growth of the polyolefin particles. The polyolefin particles which have grown in the reaction zone 25b are then discharged from the particle discharging tube 35.

For a stable spouted bed 8 to form in the reaction zone 25b, it is preferable that the following operating condition be satisfied; i.e., that the gas superficial velocity $U_0$ be equal to or greater than the minimum gas superficial velocity Ums at which a spouted bed is capable of forming. In addition to the physical properties of the powder and gases being handled, the minimum gas superficial velocity Urns is also influenced by the shape of the polymerization reactor. Various formulas have been proposed for calculating the minimum gas superficial velocity Urns. One example is formula (1) below.

$$Ums = \frac{d_P}{d_B}\left(\frac{d_A}{d_B}\right)^{1/3} \sqrt{\frac{2gL_S(\rho_S - \rho_G)}{\rho_G}} \times \left(\frac{\rho_G}{\rho_{AIR}}\right)^{0.2} \quad (1)$$

In this formula, $d_P$ is the particle diameter, $\rho_S$ is the particle density, $\rho_G$ is the gas density under the pressure and temperature conditions of the reaction zone, $\rho_{AIR}$ is the density of air under room temperature conditions, and $L_S$ is the height of the spouted bed. For the sake of volume efficiency and to form a more stable spouted bed, it is preferable for the lower limit in the spouted bed height Ls to be set so that the powder level of the spouted bed is at a higher position than the top end 30a of the tubular baffle 30. Also, from the standpoint of forming the spouted bed, the upper limit in the spouted bed height Ls is preferably set so that the powder level of the spouted bed is at a lower position than the upper conical baffle 22 which functions as a deflector.

The spouted bed height $L_S$ within the reaction zone 25b is equal to or less than the maximum spouted bed height $Ls_{MAX}$ at which a spouted bed is capable of forming, and is not subject to any particular limitation provided it is equal to or less than the maximum spouted bed height $Ls_{MAX}$. Various formulas for calculating the maximum spouted bed height $Ls_{MAX}$ have been proposed, one of which is formula (2) below.

$$\frac{Ls_{MAX}}{d_B} = \frac{d_B}{d_A}\left\{0.218 + \frac{0.005(\rho_S - \rho_G)gd_A}{\rho_G u_t u_{mf}}\right\} \quad (2)$$

In this formula, $u_t$ is the terminal velocity of the particles, and $u_{mf}$ is the minimum fluidization velocity.

The olefin polymerization reactor 10A according to the present embodiment exhibits the following effects. Because the extension tube 40 is connected to the bottom end 30b of the tubular baffle 30, the upward flow of gas within the reaction zone 25b is sufficiently stable so that, even if the gas velocity and the amount of particles within the treatment zone fluctuate to some degree, the spouted bed 8 can be fully sustained. Also, owing to the presence of the extension tube 40, polyolefin particles that have begun to fall down through the gas inlet orifice are pushed up by gas entering from below within the tubular path 40a of the extension tube 40, and are able to return once again to the reaction zone 25b.

Moreover, because the lower and upper conical baffles 21 and 22 have respective cylindrical portions 21c and 22c, the flow of gas within the reaction zone 25b is more stable, enabling the formation of a more stable spouted bed 8.

The spouted bed 8 which is formed within the cylinder 12A of the olefin polymerization reaction 10A enables a narrower particle residence time distribution to be achieved than with a fluidized bed. Accordingly, in the continuous production of olefin polymer, by carrying out polymerization with a plurality of olefin polymerization reactors 10A arranged in series, for example, olefin polymer having an excellent structural uniformity can be produced. Moreover, when the production conditions are to be changed, because polyolefin particles polymerized prior to the change in conditions can be easily discharged from the vessel, the amount of off-specification product that arises as a result can be cut to a sufficient degree. Also, by providing an upper conical baffle 22 to suppress the scattering of spouted particles, the freeboard zone can be shortened, enabling a high volume efficiency to be achieved.

Second Embodiment

Polyolefin Production System

Aside from employing an olefin polymerization reactor 10B in which a plurality of spouted beds 8 are formed instead of an olefin polymerization reactor 10A in which a single spouted bed 8 is formed, the polyolefin production system 100B according to the second embodiment of the invention has a configuration similar to that of the polyolefin production system 100A of the first embodiment. The description of the second embodiment given below deals primarily with those features which differ from the first embodiment.

Figure 2:
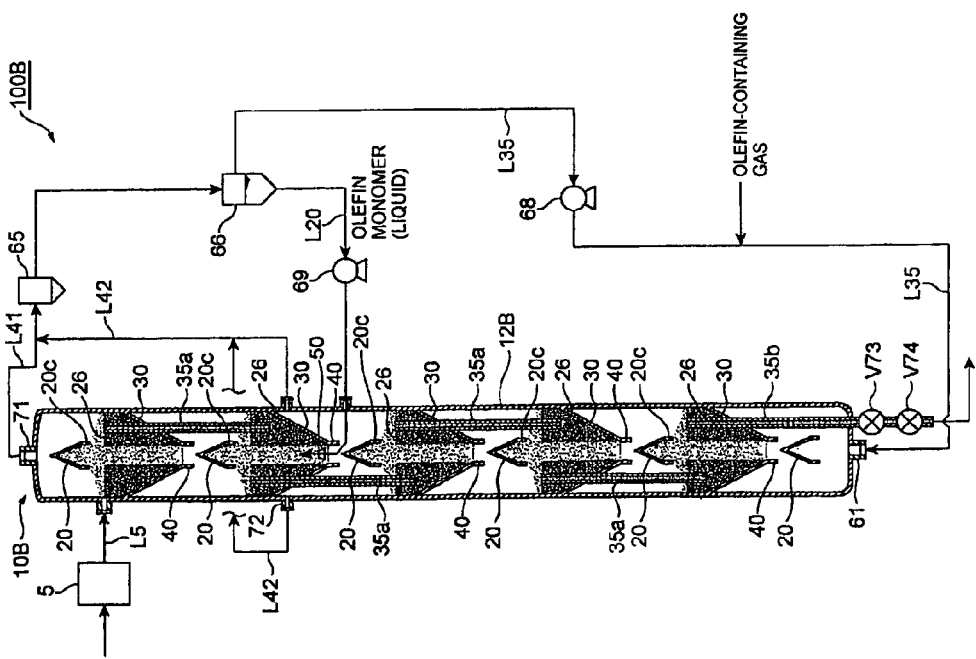
FIG. 2 is a simplified view of a second embodiment of the spouted bed device according to the present invention.

As shown in FIG. 2, the olefin polymerization reactor 10B is composed primarily of a vertically extending cylinder 12B, six conical baffles 20 provided within the cylinder 12B, and five tubular baffles (decreasing diameter members) 30 provided inside the cylinder 12B. The conical baffles 20 and the tubular baffles 30 are disposed alternately in the axial direction of the cylinder 12B. It is preferable for the conical baffles 20 and the tubular baffles 30 to all be disposed coaxial with the center axis of the cylinder 12B.

In the olefin polymerization reactor 10B, five reaction zones 26 are formed in a vertical row inside the cylinder 12B. Each reaction zone 26 is a region enclosed by the bottom surface of a tubular baffle 30, the top surface of the tubular baffle 30 directly below, and the inside surface of the portion of the cylinder 12B between these two tubular baffles 30. The topmost reaction zone 26 is a region enclosed by the inside surface of the olefin polymerization reactor 10B at the top thereof, the inside surface of the tubular baffle 30 directly therebelow, and the inside surface of the portion of the cylinder 12B therebetween.

Within each reaction zone 26, an olefin-containing gas flows upward at a high velocity through an extension tube 40 formed at a bottom end 30b of the tubular baffle 30, and out from a gas inlet orifice. This results in the formation in each reaction zone 26 of a spouted bed of polyolefin particles.

Each conical baffle 20 is constructed in a manner similar to that of the conical baffles 21 and 22 according to the first embodiment, and has a cylindrical portion 20c that extends downward from a peripheral edge of the bottom end thereof. The topmost conical baffle 20 functions as a deflector for spouted polyolefin particles, and the bottommost conical baffle 20 functions as a flow straightener. The second to fifth conical baffles 20 from the top each function as a deflector for the reaction zone 26 directly below, and as flow straighteners for the reaction zone 26 directly above.

Four upper downcomers 35a are provided so as to pass through each of the four upper tubular baffles 30 within the cylinder 12B, and a bottom downcomer 35b is provided in the bottommost tubular baffle 30. The upper downcomers 35a allow polyolefin particles to fall from an upper reaction zone 26 to a lower reaction zone 26. The purpose of the bottom downcomer 35b is to remove polyolefin particles from the bottommost reaction zone 26 and discharge the particles outside of the cylinder 12B. Two valves V73 and V74 are arranged in series with the bottom downcomer 35*b*, enabling polyolefin particles to be discharged to a subsequent step without releasing gases.

As shown in FIG. 2, a line L35 for feeding an olefin-containing gas is connected to a gas feed nozzle 61 provided at the base of the olefin polymerization reactor 10B. The olefin-containing gas is fed into the cylinder 12B by means of a compressor 68 provided on the line L35.

A gas discharging line L41 for discharging gas that has risen inside the cylinder 12B is connected to a gas discharge nozzle 71 provided at the top of the cylinder 12B. The gas that has been discharged through the gas discharging line L41 has gas-entrained particles removed therefrom by an optionally provided cyclone 65, passes through a cooling means or the like (not shown), then is introduced to a gas-liquid separator 66. The gas separated off by this gas-liquid separator 66 is introduced through line L35 to line L30 and thereby recycled.

A liquid feed nozzle 50 for supplying liquid olefin separated by the gas-liquid separator 66 from outside the cylinder 12B to the interior of a given reaction zone 26 is provided on the cylinder 12B. Specifically, as shown in FIG. 2, a liquid feed nozzle 50 is situated near the bottom end of the extension tube 40 provided on the second tubular baffle 30 from the top, so as to be able to spray liquid olefin toward the spout. A pump 69 and a line L20 are connected to this liquid feed nozzle 50 for feeding liquefied olefin monomer as needed.

Also, a plurality of gas discharge nozzles 72 are provided in portions of the cylinder 12B facing the bottom surfaces of the tubular baffles 30. Specifically, as shown in FIG. 2, gas discharge nozzles 72 are provided in the portion of the cylinder 12B facing the bottom surface of the second tubular baffle 30 from the top. These gas discharge nozzles 72 are connected to line L41 through a line L42. The amount of gas discharged from the gas discharge nozzles 72 is controlled on each nozzle 72 by a valve or the like so as to be substantially equal to the amount of gas that has been supplied from the liquid feed nozzle 50 and vaporized. Therefore, even when liquefied olefin monomer from the liquid feed nozzle 50 has been fed into the cylinder 12B, the superficial velocity of the gas within the cylinder 12B is kept substantially constant in the vertical direction.

In addition, a line L5 is connected to a position on the cylinder 12B which is higher than the topmost tubular baffle 30, and polyolefin particles containing solid particles of a olefin polymerization catalyst are fed through this line L5 to the topmost reaction zone 26.

Polyolefin Production Process

Next, a process for producing polyolefin using the production system 100B according to the present embodiment is described.

First, polyolefin particles containing a catalyst component having polymerization activity are formed in the olefin prepolymerization reactor 5 using an olefin polymerization catalyst obtained by a known method.

Separately from the above, an olefin monomer gas is fed via line L35 into the olefin polymerization reactor 10B from the gas feed nozzle 61, the pressure is raised to the polymerization pressure, and the interior of the cylinder 12B is heated. The polymerization pressure, which may be any pressure within a range at which the olefin is capable of being present in the reactor as a gas phase, is generally from standard pressure to 10 MPaG, preferably from 0.2 to 8 MPaG, and more preferably from 0.5 to 5 MPaG. At a polymerization pressure below standard pressure, the productivity may decrease. On the other hand, at a reaction pressure above 10 MPaG, equipment costs for the reactor may become high. The polymerization temperature varies according to the type of monomer, the molecular weight of the product and other factors, although a temperature below the melting point of the olefin polymer, and preferably at least 10° C. lower than the melting point, is desirable. Specifically, the temperature is preferably from 0 to 120° C., more preferably from 20 to 100° C., and even more preferably from 40 to 100° C. It is preferable to carry out polymerization in an environment which is substantially free of moisture. The presence of moisture may lower the polymerization activity of the polymerization catalyst. Also, the presence of excess oxygen, carbon monoxide or carbon dioxide within the polymerization reaction system may lower the polymerization activity.

Next, polyolefin particles having a particle diameter of from about 0.5 mm to about 5.0 mm which have been obtained separately by a known method are fed to the cylinder 12B through a feed line (not shown) connected to line L5. The polyolefin particles fed into the cylinder 12B are most often particles which do not contain a catalyst component having a polymerization activity, although the presence within the particles of a catalyst component having a polymerization activity is acceptable.

When polyolefin particles are fed into the cylinder 12B while supplying olefin monomer gas from the gas feed nozzle 61, as shown in FIG. 2, a spouted bed of polyolefin particles is formed within each reaction zone 26.

Once a spouted bed has been formed within each reaction zone 26, the polyolefin particles containing a catalyst component having a polymerization activity that were formed in the olefin prepolymerization reactor 5 are fed from line L5 into the cylinder 12B at a constant rate per unit time, thereby commencing steady-stage operation of the olefin polymerization reactor 10B. As the polyolefin particles grow within each reaction zone 26, they successively fall through the upper downcomers 35*a* into the reaction zone 26 below, and are eventually discharged from the bottom downcomer 35*b*.

Meanwhile, part of the olefin monomer-containing gas forms a spout and sweeps past the particle bed, while the remainder of the gas diffuses into the portion of the particle bed having an annular structure. In this way, the olefin-containing gas and the polyolefin particles undergo solid-gas contact and the action of the catalyst within the polyolefin particles causes the olefin polymerization reaction to proceed, resulting in growth of the polyolefin particles.

To form a stable spouted bed 8 in each reaction zone 26, it is preferable that the conditions described in the first embodiment be satisfied; i.e., that the conditions relating to the gas superficial velocity $U_0$ and the spouted bed height $L_S$ be satisfied.

Liquid olefin monomer may be supplied from the above-described liquid feed nozzle 50. This enables the olefin monomer consumed by the polymerization reaction to be replenished. In addition, when the liquid olefin monomer vaporizes within the cylinder 12B, heat removal from the polyolefin particles is also possible owing to the latent heat of vaporization. In the plurality of reaction zones 26 within the cylinder 12B, on account of the heat of reaction, the temperature of a reaction zone 26 tends to be higher the further up the reaction zone 26 is located within the cylinder 12B, resulting in a temperature difference with lower reaction zones 26. Hence, to equalize the temperature, liquid olefin monomer is fed from a nozzle 50 provided at an intermediate stage of the cylinder 12B, thereby enabling this temperature difference to be held to a minimum.

The olefin polymerization reactor 10B according to the present embodiment exhibits the following effects. Because an extension tube 40 is connected to the bottom end 30*b* of each tubular baffle 30, the upward flow of gas within the reaction zone 26 is sufficiently stable so that, even if some degree of fluctuation occurs in the gas velocity and the amount of particles within the treatment zone, the spouted bed can be fully sustained. Also, owing to the presence of the extension tube 40, polyolefin particles that have started to fall down through the gas inlet orifice are pushed up by gas entering from below within the tubular path 40a of the extension tube 40, and are able to return once again to the reaction zone 26.

Moreover, because each conical baffle 20 has a cylindrical portion 20c, the flow of gas within the reaction zone 26 is more stable, as a result of which a more stable spouted bed is formed.

In addition, a plurality of spouted beds 8 form within the cylinder 12B, enabling a narrower particle residence time distribution to be achieved. Accordingly, in the continuous production of olefin polymer, olefin polymer having an excellent structural uniformity can be produced. Moreover, when the production conditions are to be changed, because polyolefin particles polymerized prior to the change in conditions can be easily discharged from the vessel, the amount of off-specification product that arises as a result can be cut to a sufficient degree. Also, by providing a conical baffle 20 to keep spouted particles from scattering, the freeboard zone can be shortened, enabling a high volume efficiency to be achieved.

Preferred embodiments of the present invention have been described above in detail. However, the invention is not limited to the above first and second embodiments. For example, in the above embodiments, no interior members are mentioned as being provided within the tubular path 40a of the extension tube 40. However, an extension tube that additionally has partitions which are present within and extend in the longitudinal direction of the extension tube 40 and which divide the tubular path 40a in the horizontal direction may be employed. Specific forms of such extension tubes are shown in (a) of FIG. 3 to (c) of FIG. 3. (a) of FIG. 3 to (c) of FIG. 3 show sectional diagrams taken perpendicular to the lengthwise direction of the respective extension tube. The partitions 40b in the extension tube 41 shown in (a) of FIG. 3 have a lattice structure, the partitions 40c in the extension tube 42 shown in (b) of FIG. 3 have a honeycomb structure, and the partitions 40d in the extension tube 43 shown in (c) of FIG. 3 have an inscribed circle structure. The latter extension tube 43 has a structure composed of a plurality of cylindrical tubes arranged in parallel inside the tubular path. Compared to the other structures, this has the advantage of being easy to construct.

The partitions provided in the tubular path of the extension tube are not limited to the forms shown in (a) of FIG. 3 to (c) of FIG. 3. For example, they may have forms such as those shown in FIGS. 4 and 5. The partitions 40b and 40c shown in (a) of FIG. 4 and (b) of FIG. 4 are shaped in such a way that the openings are formed at the center of the extension tube. The extension tubes 44 and 45 shown in (a) of FIG. 5 and (b) of FIG. 5 have one or two cylindrical members which are positioned coaxially within the tubular path; these members form partitions 40e and 40f.

Instead of providing partitions in the tubular path 40a of the extension tube 40, as shown in FIG. 6, a gas inlet portion may be formed by coaxially placing within the tubular path 40a a cylindrical member 46 closed at the top end. By placing a tubular member 46 within the tubular path 40a, an annulus 46a is formed by the outside wall of the cylindrical member 46 and the inside wall of the extension tube 40. This arrangement can be used to give the horizontal cross-section of the tubular path 40a an annular shape. As a result, compared with cases in which a tubular path having the same cross-sectional surface area as annulus 46a and having a circular cross-section is employed, the pushing up effect on particles which have started to fall down through the gas inlet orifice improves, enabling a further reduction in the amount of particles that drop down. To suppress turbulence in the gas flow, as shown in FIG. 6, it is preferable for the top side of the cylindrical member 46 to have a tapered shape. The cylindrical member 46 should be closed at one or more end. A member of this type that is closed at the bottom end or at both ends may be used.

The gas inlet portion may have an arrangement like that shown in FIG. 7. As shown in FIG. 7, an extension tube 40 has a closing plate 47 which closes the bottom end of the tube, and has a gas inlet tube 48 which has a tubular path 48a narrower than tubular path 40a of the extension tube 40 and is provided so as to pass through the closing plate 47. In addition, a conical baffle 23 is situated directly over the top end of the gas inlet tube 48. This conical baffle 23 has an outside diameter that increases progressively downward, is closed at the top end, and has a bottom end that is spaced apart from the inside wall of the extension tube 40. By employing this arrangement, the conical baffle 23 serves as a particle fall-back preventing plate, thereby making it possible to sufficiently prevent particles from falling down through the gas inlet orifice when the supply of gas is stopped. Moreover, to even further stabilize the fluid state of the spouted bed, as shown in FIG. 8, it is preferable for the conical baffle 23 to have a cylindrical portion 23c which extends downward from the peripheral edge at the bottom end thereof.

The bottom end portion of the extension tubes 40 to 45 may have a bellmouth shape. FIG. 9 shows an extension tube 49 with a bottom end portion 40g having a bellmouth shape. By employing an extension tube having the above-described partitions, an annulus and/or a bellmouth-shaped bottom end portion, the pushing up effect on particles which have started to fall down through the gas inlet orifice of the tubular baffle 30 improves, enabling the amount of particles that drop down to be further reduced.

The first embodiment described above was illustrated by a case in which two conical baffles 21 and 22 are disposed for a single spouted bed 8. However, the spouted bed device according to the first embodiment of the invention may have only one of these two conical baffles, or may even have no conical baffle at all.

In the second embodiment of the invention, an olefin polymerization reactor in which five spouted beds are formed in the vertical direction was described. However, the number of spouted beds is not limited to five. From the standpoint of achieving a sufficient plug flow effect, the number of spouted beds is preferably at least three, and more preferably at least six. Moreover, the plurality of spouted beds need not necessarily be formed in the vertical direction. For example, a plurality of olefin polymerization reactors 10A according to the first embodiment may be arranged in a horizontal direction and coupled in series. Also, in reactor design and operation control, it is preferable to design the volume of each reactor stage and control the polyolefin particle hold-up or residence time in such a way as to narrow the residence time distribution of the polyolefin particles and to make the amount of polyolefin produced at each stage (including the olefin prepolymerization reactor 5) more uniform.

Moreover, the second embodiment was illustrated for a case in which liquid olefin is fed to the second reaction zone 26 from a liquid feed nozzle 50. However, the positions and number of liquid feed nozzles 50 may be suitably set according to the type of polyolefin particles to be produced. For example, if the temperatures of the respective reaction zones 26 can be equalized by some other means, it may not be necessary to provide a liquid feed nozzle 50. Alternatively, a liquid feed nozzle 50 may be provided near the gas inlet orifice at each of the tubular baffles 30.

The use of the spouted bed device of the present invention as an olefin polymerization reactor has been illustrated in the above embodiments. However, the inventive spouted bed device is not limited to this particular application, and may be employed in any granular material treatment for which the use of a spouted bed is appropriate. For example, the spouted bed device of the invention may be employed in other chemical reactions or in processes such as the drying, granulation or sintering of powders.

EXAMPLES

Example 1

A cylindrical cold model reactor made of transparent polyvinyl chloride and capable of forming two spouted beds inside the cylinder was furnished to evaluate the stability of spouted beds which form in the spouted bed device according to the present invention. This unit had two tubular baffles of inverted conical shape with a gas inlet orifice therein, each of which was paired with a conical baffle (first type of conical baffle); all the baffles were disposed vertically and coaxially within the cylinder.

The cylindrical cold model reactor had an inside diameter $d_B$ of 500 mm, and the gas inlet orifice at the bottom end of each of the two tubular baffles had a diameter $d_A$ of 100 mm. Accordingly, in the present example, the ratio $d_A/d_B$ between the gas inlet orifice diameter $d_A$ and the cylinder inside diameter $d_B$ was 0.2.

An extension tube (length, 100 mm; inside diameter, 100 mm) was connected to the bottom end of the top tubular baffle in such a way that gas was fed into the treatment zone by passing through this extension tube. The device used in this example had a Type A-1 gas inlet portion (see FIG. 10). FIGS. 10 and 11 are schematic cross-sectional diagrams showing the gas inlet portions of the devices used in the examples of the invention and the comparative examples. The left side in FIGS. 10 and 11 shows sectional views of the gas inlet portion taken in the vertical direction, and the right side shows sectional views of the extension tube taken in the horizontal direction.

The angle of inclination between the inside surfaces of the tubular baffles and the horizontal and the angle of inclination between the outside surfaces of the conical baffles and the horizontal were each 65°. The two tubular baffles having an inverted conical shape were each provided with a downcomer having an inside diameter of 40 mm. The conical baffles had an inside diameter at the bottom end of 300 mm, and were hollow at the interior.

The gas introduced into the unit was room-temperature air, and the gas inflow rate was set to 4.7 m³ per minute. The particles used were polypropylene particles having an average particle size of 900 μm. The top treatment zone and the bottom treatment zone were each filled with 30 kg of polypropylene particles, and spouted beds were formed in the respective treatment zones by feeding in gas at the above-indicated rate from the gas inlet orifice in the bottom tubular baffle.

As a result, at a gas inflow rate of 4.7 m³/min, a spouted bed flow state wherein a spout having a dilute particle concentration near a center axis and composed of particles that flow upward together with the gas is stably formed and particles drop down at the periphery of the spout in a moving bed state was observed on the top and the bottom tubular baffles. Polypropylene particles did not drop down through the gas inlet orifice.

When the gas inflow rate was subsequently changed from 4.7 m³/min to 4.0 m³/min, a spouted bed state was observed on the top and the bottom tubular baffles, but a small amount of polypropylene particles was observed to drop down through the gas inlet orifice from the top treatment zone to the bottom treatment zone.

Example 2

Aside from changing the amount of polypropylene particles packed into each of the top and bottom reaction zones to 25 kg instead of 30 kg, the same procedure was followed as in Example 1 and the flow state of polypropylene particles on the tubular baffles was observed.

As a result, at a gas inflow rate of 4.7 m³/min, a stable spouted bed flow state was observed on the top and the bottom tubular baffles. Also, polypropylene particles did not drop down through the gas inlet orifice from the top treatment zone to the bottom treatment zone. However, at a gas inflow rate of 4.0 m³/min, although a spouted bed flow state was observed in the top and bottom treatment zones, a small amount of polypropylene particles was observed to drop down through the gas inlet orifice from the top treatment zone to the bottom treatment zone.

Example 3

Aside from using conical baffles configured as described below instead of the conical baffles used in Example 1, the same procedure was followed as in Example 1, and the flow state of polypropylene particles on the tubular baffles was observed. That is, the conical baffles used in the present example were hollow at the interior, had an outside diameter at the bottom end of 200 mm, and had a cylindrical portion (length, 100 mm; outside diameter, 200 mm; inside diameter, 192 mm) which extends downward from the peripheral edge of the bottom end.

As a result, at gas inflow rates of 4.7 m³/min and 4.0 m³/min, a spouted bed flow state was observed on the top and the bottom tubular baffles. Also, polypropylene particles did not drop down through the gas inlet orifice from the top treatment zone to the bottom treatment zone. When the gas inflow rate was changed from 4.0 m³/min to 3.3 m³/min, although a spouted bed flow state was observed on the tubular baffles, a small amount of polypropylene particles was observed to drop down through the gas inlet orifice from the top treatment zone to the bottom treatment zone.

Example 4

Aside from installing top and bottom tubular baffles having a gas inlet orifice diameter $d_A$ of 75 mm in place of tubular baffles having a diameter $d_A$ of 100 mm, evaluations of spouted bed stability were carried out using a cylindrical cold model reactor of the same construction as in Example 1. The top gas inlet portion (Type A-2) in the device used in this example had an extension tube (length, 100 mm; inside diameter, 75 mm) connected to the bottom end of the tubular baffle. In this example, the ratio $d_A/d_B$ between the gas inlet orifice diameter $d_A$ and the cylinder inside diameter $d_B$ was 0.15.

As a result, at gas inflow rates of 4.7 m³/min and 4.0 m³/min, a spouted bed flow state was observed on the top and the bottom tubular baffles. Also, polypropylene particles did not drop down through the gas inlet orifice from the top treatment zone to the bottom treatment zone. When the gas inflow rate was changed from 4.0 m³/min to 3.3 m³/mm, a spouted bed flow state was observed on the top and bottom tubular baffles and polypropylene particles did not drop down through the gas inlet orifice from the top treatment zone to the bottom treatment zone.

Comparative Example 1

Aside from installing a tubular baffle without an extension tube instead of the tubular baffle having an extension tube connected thereto, evaluations of spouted bed stability were carried out using a cylindrical cold model reactor of the same construction as in Example 1. The device used in this comparative example had the Type F-1 gas inlet portion shown in FIG. 11.

The gas introduced in this comparative examples was room-temperature air, and the gas inflow rate was set at 4.7 m³/min. The particles used were polypropylene particles having an average particle size of 900 μm. The top treatment zone and the bottom treatment zone were each filled with 30 kg of polypropylene particles, and gas was supplied at the above-indicated flow rate from the gas inlet orifice in the bottom tubular baffle.

As a result, when the amount of polypropylene particles packed into each treatment zone was 30 kg, a stable spouted bed flow rate was observed in the top and bottom treatment zones. However, when the amount of polypropylene particles packed into each of the top and bottom treatment zones was reduced from 30 kg to 25 kg, polypropylene particles in the top treatment zone were observed to drop down through the gas inlet orifice into the bottom treatment zone. Moreover, several minutes later, all of the polypropylene which had been inside the top treatment zone was found to have dropped into the bottom treatment zone, making the formation of a spouted bed in the top treatment zone impossible.

Comparative Example 2

Aside from using tubular baffles and conical baffles configured as described below in place of the tubular baffle (top) and the conical baffle used in Example 3, evaluations of spouted bed stability were carried out using a cylindrical cold model reactor of the same construction as in Example 3. That is, in this comparative example, a tubular baffle which, aside from not having an extension tube, had the same construction as the top tubular baffle employed in Example 3 was used as the top tubular baffle. Also, a conical baffle which was hollow at the interior, had an outside diameter at the bottom end of 200 mm, and did not have a cylindrical portion which extends downward from the peripheral edge of the bottom end was used. The device used in this comparative example had the Type F-1 gas inlet portion shown in FIG. 11.

The gas introduced in this comparative examples was room-temperature air, and the gas inflow rate was set at 4.0 m³/min. The particles used were polypropylene particles having an average particle size of 900 μm. The top treatment zone and the bottom treatment zone were each filled with 25 kg of polypropylene particles, and gas was supplied at the above-indicated flow rate from the gas inlet orifice in the bottom tubular baffle.

As a result, polypropylene particles in the top treatment zone were observed to drop down through the gas inlet orifice into the bottom treatment zone. Moreover, several minutes later, all of the polypropylene which had been inside the top treatment zone was found to have dropped into the bottom treatment zone, making the formation of a spouted bed in the top treatment zone impossible.

Comparative Example 3

Aside from using the tubular baffle (top) without an extension tube instead of the tubular baffle used in Example 4, evaluations of spouted bed stability were carried out using a cylindrical cold model reactor of the same construction as in Example 4.

The gas introduced in this comparative examples was room-temperature air, and the gas inflow rate was set at 4.0 m³/min. The particles used were polypropylene particles having an average particle size of 900 μm. The top treatment zone and the bottom treatment zone were each filled with 25 kg of polypropylene particles, and gas was supplied at the above-indicated flow rate from the gas inlet orifice in the bottom tubular baffle.

As a result, a spouted bed flow state was observed on the top and bottom tubular baffles, but a small amount of polypropylene particles was observed to drop down through the gas inlet orifice from the top treatment zone to the bottom treatment zone.

The conditions and results for the above examples of the invention and comparative examples are shown below in Tables 1 and 2.

TABLE 1

|  | Example 1 | Example 2 | Example 3 | Example 4 |
| --- | --- | --- | --- | --- |
| Construction of gas inlet portion | type A-1 | type A-1 | type A-1 | type A-2 |
| Orifice diameter (mm) | 100 | 100 | 100 | 75 |
| Diameter of circle of same surface area as orifice (mm) | 100 | 100 | 100 | 75 |
| Extension tube below orifice | yes | yes | yes | yes |
| Tubular portion at bottom end of first type of conical baffle | no | no | yes | no |
| Outside diameter of first type of conical baffle (mm) | 300 | 300 | 200 | 300 |
| Gas inflow rate (m³/min) | 4.7 → 4.0 | 4.7 → 4.0 | 4.7 → 4.0 → 3.3 | 4.7 → 4.0 → 3.3 |
| Amount of particles packed (kg) | 30 | 25 | 25 | 25 |
| Particle fall-back — Gas inflow rate, 4.7 m³/min | no | no | no | no |
| Particle fall-back — Gas inflow rate, 4.0 m³/min | small amount | small amount | no | no |
| Particle fall-back — Gas inflow rate, 3.3 m³/min | — | — | small amount | no |
| Particle fall-back — Gas inflow rate, 0.0 m³/min | — | — | — | — |

TABLE 2

|  | Comp. Ex. 1 | Comp. Ex. 2 | Comp. Ex. 3 |
|---|---|---|---|
| Construction of gas inlet portion | type F-1 | type F-1 | type F-2 |
| Orifice diameter (mm) | 100 | 100 | 75 |
| Diameter of circle of same surface area as orifice (mm) | 100 | 100 | 75 |
| Extension tube below orifice | no | no | no |
| Tubular portion at bottom end of first type of conical baffle | no | no | no |
| Outside diameter of first type of conical baffle (mm) | 300 | 200 | 300 |
| Gas inflow rate (m³/min) | 4.7 | 4.0 | 4.0 |
| Amount of particles packed (kg) | 30 → 25 | 25 | 25 |
| Particle fall-back — Amount of packed particles, 30 kg | no | — | — |
| Amount of packed particles, 25 kg | yes | yes | small amount |

Example 5

Aside from employing a gas inlet portion having a type B-1 construction instead of a type A-1 construction, the same procedure was followed as in Example 1 and the flow state of polypropylene particles on the tubular baffles was observed. That is, in this example, evaluation was carried out using a device in which a cylindrical member (outside diameter, 85 mm; inside diameter, 75 mm) was coaxially mounted in the extension tube (see (a) of FIG. 5).

As a result, a spouted bed flow state was observed on the top and bottom tubular baffles at volumetric flow rates of the introduced gas of both 4.7 m³/min and 4.0 m³/min. Polypropylene particles did not drop through the gas inlet orifice from the top treatment zone to the bottom treatment zone. When the gas inflow rate was changed from 4.0 m³/min to 3.3 m³/min, a spouted bed flow state was observed on the top and bottom tubular baffles, but a small amount of polypropylene particles was observed to drop through the gas inlet orifice from the top treatment zone to the bottom treatment zone.

Example 6

Aside from employing a gas inlet portion having a type B-2 construction instead of a type A-1 construction, the same procedure was followed as in Example 1 and the flow state of polypropylene particles on the tubular baffles was observed. That is, in this example, evaluation was carried out using a device in which a cylindrical member I (outside diameter, 85 mm; inside diameter, 75 mm) and a cylindrical member II (outside diameter, 48 mm; inside diameter, 42 mm) were coaxially mounted in the extension tube (see (b) of FIG. 5).

As a result, a spouted bed flow state was observed on the top and bottom tubular baffles at volumetric flow rates of the introduced gas of both 4.7 m³/min and 4.0 m³/min. Polypropylene particles did not drop through the gas inlet orifice from the top treatment zone to the bottom treatment zone. When the gas inflow rate was changed from 4.0 m³/min to 3.3 m³/min, a spouted bed flow state was observed on the top and bottom tubular baffles, and polypropylene particles did not drop through the gas inlet orifice from the top treatment zone to the bottom treatment zone.

Example 7

Aside from employing a gas inlet portion having a type C-1 construction instead of a type A-1 construction, the same procedure was followed as in Example 1 and the flow state of polypropylene particles on the tubular baffles was observed. That is, in this example, a test was conducted using a device in which 19 cylindrical members (outside diameter, 20 mm; inside diameter, 16 mm) were installed inside the extension tube (see (c) of FIG. 3). In addition, cylindrical baffles having a gas inlet orifice with a diameter $d_A$ of 150 mm were installed in the top and bottom stages of the device.

As a result, spouted beds having extremely stable flow states were observed on the top and bottom tubular baffles at volumetric flow rates of the introduced gas of both 4.7 m³/min and 4.0 m³/min. Moreover, polypropylene particles did not drop through the gas inlet orifice from the top treatment zone to the bottom treatment zone. When the gas inflow rate was changed from 4.0 m³/min to 3.3 m³/min, a spouted bed flow state was observed on the top and bottom tubular baffles, and polypropylene particles did not drop through the gas inlet orifice from the top treatment zone to the bottom treatment zone.

Example 8

Aside from employing a gas inlet portion having a type C-2 construction instead of a type A-1 construction, the same procedure was followed as in Example 1 and the flow state of polypropylene particles on the tubular baffles was observed. That is, in this example, evaluation was carried out using a device in which 81 cylindrical members (outside diameter, 10 mm; inside diameter, 7 mm) were installed inside the extension tube. In addition, cylindrical baffles having a gas inlet orifice with a diameter $d_A$ of 150 mm were installed in the top and bottom stages of the device.

As a result, spouted beds having extremely stable flow states were observed on the top and bottom tubular baffles at volumetric flow rates of the introduced gas of both 4.7 m³/min and 4.0 m³/min. Moreover, polypropylene particles did not drop through the gas inlet orifice from the top treatment zone to the bottom treatment zone. When the gas inflow rate was changed from 4.0 m³/min to 3.3 m³/min, an extremely stable spouted bed flow state was observed on the top and bottom tubular baffles, and polypropylene particles did not drop through the gas inlet orifice from the top treatment zone to the bottom treatment zone.

TABLE 3

|  | Example 5 | Example 6 | Example 7 | Example 8 |
| --- | --- | --- | --- | --- |
| Construction of gas inlet portion | type B-1 | type B-2 | type C-1 | type C-2 |
| Orifice diameter (mm) | 100 | 100 | 100 | 100 |
| Diameter of circle of same surface area as orifice (mm) | 100 | 100 | 100 | 100 |
| Extension tube below orifice | yes | yes | yes | yes |
| Tubular portion at bottom end of first type of conical baffle | no | no | yes | yes |
| Outside diameter of first type of conical baffle (mm) | 300 | 300 | 200 | 200 |
| Amount of particles packed (kg) | 25 | 25 | 25 | 25 |
| Particle fall-back  Gas inflow rate, 4.7 m³/min | no | no | no | no |
| Gas inflow rate, 4.0 m³/min | no | no | no | no |
| Gas inflow rate, 3.3 m³/min | small amount | no | no | no |
| Gas inflow rate, 0.0 m³/min | — | — | — | — |

Example 9

Aside from employing a gas inlet portion having a type C-3 construction instead of a type A-1 construction, the same procedure was followed as in Example 1 and the flow state of polypropylene particles on the tubular baffles was observed. That is, in this example, evaluation was carried out using a device in which 128 cylindrical members (outside diameter, 10 mm; inside diameter, 7 mm) were installed inside the extension tube. In addition, cylindrical baffles having a gas inlet orifice with a diameter $d_A$ of 125 mm were installed in the top and bottom stages of the device.

As a result, spouted beds having extremely stable flow states were observed on the top and bottom tubular baffles at volumetric flow rates of the introduced gas of both 4.7 m³/min and 4.0 m³/min. Moreover, polypropylene particles did not drop through the gas inlet orifice from the top treatment zone to the bottom treatment zone. When the gas inflow rate was changed from 4.0 m³/min to 3.3 m³/min, an extremely stable spouted bed flow state was observed on the top and bottom tubular baffles, and polypropylene particles did not drop through the gas inlet orifice from the top treatment zone to the bottom treatment zone.

Example 10

Aside from employing a gas inlet portion having a type C-4 construction instead of a type A-1 construction, the same procedure was followed as in Example 1 and the flow state of polypropylene particles on the tubular baffles was observed. That is, in this example, evaluation was carried out using a device in which 185 cylindrical members (outside diameter, 10 mm; inside diameter, 7 mm) were installed inside the extension tube. In addition, cylindrical baffles having a gas inlet orifice with a diameter $d_A$ of 150 mm were installed in the top and bottom stages of the device.

As a result, spouted beds having extremely stable flow states were observed on the top and bottom tubular baffles at volumetric flow rates of the introduced gas of both 4.7 m³/min and 4.0 m³/min. Moreover, polypropylene particles did not drop through the gas inlet orifice from the top treatment zone to the bottom treatment zone. When the gas inflow rate was changed from 4.0 m³/min to 3.3 m³/min, an extremely stable spouted bed flow state was observed on the top and bottom tubular baffles, and polypropylene particles did not drop through the gas inlet orifice from the top treatment zone to the bottom treatment zone.

Example 11

Aside from employing a gas inlet portion having a type D construction instead of a type A-1 construction, the same procedure was followed as in Example 1 and the flow state of polypropylene particles on the tubular baffles was observed. That is, in this example, evaluation was carried out using a device in which a cylindrical member (outside diameter, 110 mm) closed at the top end was installed inside the extension tube. In addition, cylindrical baffles having a gas inlet orifice with a diameter $d_A$ of 150 mm were installed in the top and bottom stages of the device.

As a result, a spouted bed flow state was observed on the top and bottom tubular baffles at volumetric flow rates of the introduced gas of both 4.7 m³/min and 4.0 m³/min. Moreover, polypropylene particles did not drop through the gas inlet orifice from the top treatment zone to the bottom treatment zone. When the gas inflow rate was changed from 4.0 m³/min to 3.3 m³/min, a spouted bed flow state was observed on the top and bottom tubular baffles, and polypropylene particles did not drop through the gas inlet orifice from the top treatment zone to the bottom treatment zone.

Example 12

Aside from employing a gas inlet portion having a type E construction instead of a type A-1 construction, the same procedure was followed as in Example 1 and the flow state of polypropylene particles on the tubular baffles was observed. That is, in this example, a test was conducted using a device equipped with a conical baffle (second type of conical baffle) having a cylindrical portion (outside diameter, 125 mm), a closing plate and a gas inlet tube (inside diameter, 77 mm) (see FIG. 7). In addition, cylindrical baffles having a gas inlet orifice with a diameter $d_A$ of 150 mm were installed in the top and bottom stages of the device.

As a result, a spouted bed flow state was observed on the top and bottom tubular baffles at volumetric flow rates of the introduced gas of both 4.7 m³/min and 4.0 m³/min. Moreover, polypropylene particles did not drop through the gas inlet orifice from the top treatment zone to the bottom treatment zone. When the gas inflow rate was changed from 4.0 m³/min to 3.3 m³/min, a spouted bed flow state was observed on the top and bottom tubular baffles, and polypropylene particles did not drop through the gas inlet orifice from the top treatment zone to the bottom treatment zone. In addition, the gas inflow rate was changed from 3.3 m³/min to 0.0 m³/min. In this example, even when gas supply was stopped, the particles did not drop down through the gas inlet orifice.

TABLE 4

|  | Example 9 | Example 10 | Example 11 | Example 12 |
|---|---|---|---|---|
| Construction of gas inlet portion | type C-3 | type C-4 | type D | type E |
| Orifice diameter (mm) | 125 | 150 | 150 | 150 |
| Diameter of circle of same surface area as orifice (mm) | 95 | 114 | 102 | 83 |
| Extension tube below orifice | yes | yes | yes | yes |
| Tubular portion at bottom end of first type of conical baffle | no | no | no | no |
| Outside diameter of first type of conical baffle (mm) | 300 | 300 | 300 | 300 |
| Amount of particles packed (kg) | 25 | 25 | 25 | 25 |
| Particle fall-back  Gas inflow rate, 4.7 m³/min | no | no | no | no |
| Gas inflow rate, 4.0 m³/min | no | no | no | no |
| Gas inflow rate, 3.3 m³/min | no | no | no | no |
| Gas inflow rate, 0.0 m³/min | — | — | — | no |

Example 13

In Example 13, a polyolefin production process having a step (Polymerization Step II) in which propylene homopolymerization is performed using a spouted bed-type reactor was carried out. Measurement and evaluation of the polymer properties in this example 13 were carried as described below.

(i) Intrinsic Viscosity (Units: dl/g)

Three different samples were prepared by dissolving the polymer in 1,2,3,4-tetrahydronaphthalene solvent to predetermined concentrations. The polymer concentrations of the respective samples were set to 0.1 g/dl, 0.2 g/dl and 0.5 g/dl. The reduced viscosities of these samples were measured at a temperature of 135° C. using an Ubbelohde viscometer. In accordance with the method of calculation described on page 491 of *Kōbunshi yōeki* [Polymer solutions], which is volume 11 of *Kōbunshi Jikkengaku* [Experimental polymer science] (1982, Kyoritsu Shuppan), the reduced viscosity was plotted versus the concentration, and the intrinsic viscosity was determined by extrapolating the concentration to zero.

(ii) Polymerization Activities in Respective Polymerization Steps (Units: g/g)

The polymerization activities were calculated by dividing the weight (g) of polymer produced in each polymerization step by the weight (g) of the solid catalyst component fed to that polymerization step.

Prepolymerization

A 3-liter stainless steel autoclave equipped with a stirrer was charged with 1.5 L of thoroughly dehydrated and deaerated n-hexane, 37.5 mmol of triethylaluminum and 3.75 mmol of cyclohexylethyldimethoxysilane. To this was added 15 g of a solid catalyst component, following which 15 g of propylene was continuously fed in over a period of about 30 minutes while holding the temperature within the autoclave at about 10° C., thereby carrying out prepolymerization. The prepolymerization slurry was then transferred to a stirrer-equipped 150-liter autoclave made of SUS 316L stainless steel and 100 L of liquid butane was added, thereby giving a prepolymerization catalyst component slurry. The solid catalyst component used was one prepared by the same method as that described in Examples 4(1) and (2) of Japanese Patent Application Laid-open No. 2004-182981.

Polymerization Step I (Propylene Homopolymerization with Bulk Polymerization Reactor)

Propylene homopolymerization was carried out using a stirrer-equipped, 42-liter Bessel-type bulk polymerization reactor made of SUS 304 stainless steel. The polymerization reaction was carried out while continuously feeding propylene, hydrogen, triethylaluminum, cyclohexylethyldimethoxysilane and the prepolymerization catalyst component slurry into the reactor. The reaction conditions were as follows.

Polymerization temperature: 70° C.
Stirring speed: 150 rpm
Liquid level in reactor: 30 L
Propylene feed rate: 16 kg/h
Hydrogen feed rate: 137 NL/h
Triethylaluminum feed rate: 36.0 mmol/h
Cyclohexylethyldimethoxysilane feed rate: 5.3 mmol/h
Prepolymerization catalyst component slurry feed rate (polymerization catalyst component basis): 0.602 g/h
Polymerization pressure: 4.2 MPa (gauge pressure)

In this reactor, the slurry had a mean residence time of 0.79 hour, and polypropylene particles were discharged at a rate of 5.25 kg/h. The polymerization activity in this polymerization step was 8,730 g/g. The polypropylene particles obtained had an intrinsic viscosity of 0.90 dl/g.

Polymerization Step II (Propylene Homopolymerization by Spouted Bed Reactor (Gas-Phase Polymerization))

A spouted bed-type reactor having two reaction zones in the vertical direction (1,440-liter capacity; inside diameter, 500 mm) was furnished for use. The tubular baffles and conical baffles were made of stainless steel having the Japanese Industrial Standard (JIS) designation SUS 304 (with surfaces finished by buffing to a grit size of 300), and the material making up the rest of the reactor was SUS 316 (with surfaces finished by buffing to a grit size of 300). This reactor was converted for use here from a fluidized bed reactor with stirrer. That is, the stirrer and gas dispersion plate within the original reactor were taken out and, in their place, combinations of a tubular baffle and conical baffle were installed coaxially at each of two stages in the vertical direction. The tubular baffles and conical baffles used here had the same shapes and sizes as those used in Example 4.

The above-described spouted bed-type reactor had an ejector-based transferring means. This transferring means, which was designed to transfer polypropylene particles from the upper reaction zone to the lower reaction zone, included a particle removing tube with an on-off valve, an ejector and a particle feeding line. Moreover, 10 vol % of the circulating gases (gases discharged from the top of the spouted bed-type reactor) were fed as a gas for operating the ejector.

Propylene and hydrogen were continuously fed from the bottom of the spouted bed-type reactor. In this way, a spouted bed was formed in each of the top and bottom reaction zones, in addition to which propylene homopolymerization was carried out while purging excess gas to keep the pressure constant. The reaction conditions were as follows.

Polymerization temperature: 80° C.
Polymerization pressure: 1.8 MPa (gauge pressure)
Circulating gas flow rate: 120 m³/h
Propylene feed rate: 20 kg/h
Hydrogen feed rate: 1,000 NL/h
Polypropylene particle hold-up: 57 kg (top stage, 28.5 kg; bottom stage, 28.5 kg).

In this reactor, the polypropylene particles had a mean residence time of 3.9 hours, the concentration ratio of the gases within the reactor (hydrogen/(hydrogen+propylene)) was 10.2 mol %, and the polymer particle discharge rate was 14.6 kg/h. The polymerization activity in this polymerization step was 15,500 g/g. The polypropylene particles obtained had an intrinsic viscosity of 0.91 dl/g.

What is claimed is:

1. A spouted bed device comprising:
a vertically extending cylinder;
a decreasing diameter member which is formed on the cylinder, has an inside diameter that decreases progressively downward, and has a gas inlet orifice at a bottom end thereof;
a tubular portion which extends downward from an edge of the gas inlet orifice; and
a conical baffle of a first type which has an outside diameter that increases progressively downward, is closed at a top end thereof, and has a bottom end that is spaced apart from an inside wall of the cylinder;
wherein the conical baffle of the first type is disposed at a position which is below and opposite a bottom end of the tubular portion.

2. The spouted bed device of claim 1, further comprising:
a second conical baffle of the first type which has an outside diameter that increases progressively downward, is closed at a top end thereof, and has a bottom end that is spaced apart from an inside wall of the cylinder,
wherein the second conical baffle of the first type is disposed above the gas inlet orifice.

3. The spouted bed device of claim 2, wherein the conical baffle of the first type is disposed above the gas inlet orifice and also above a powder level of a spouted bed formed in the spouted bed device.

4. The spouted bed device of claim 1, wherein the conical baffle of the first type has a cylindrical portion which extends downward from a peripheral edge at the bottom end thereof.

5. A spouted bed device comprising:
a vertically extending cylinder;
a decreasing diameter member which is formed on the cylinder, has an inside diameter that decreases progressively downward, and has a gas inlet orifice at the bottom end thereof;
a tubular portion which extends downward from an edge of the gas inlet orifice; and
a cylindrical member which is disposed inside the tubular portion and at least one end of which is closed;
wherein a tubular path up to the gas inlet orifice has an annulus defined by an outside wall of the cylindrical member and an inside wall of the tubular portion.

6. A spouted bed device comprising:
a vertically extending cylinder;
a decreasing diameter member which is formed on the cylinder, has an inside diameter that decreases progressively downward, and has a gas inlet orifice at the bottom end thereof;
a tubular portion which extends downward from an edge of the gas inlet orifice;
a closed plate which closes a bottom end of the tubular portion;
a gas inlet tube which has a tubular path that is narrower than the tubular path of the tubular portion and which is disposed so as to pass through the closing plate; and
a conical baffle of a second type which has an outside diameter that increases progressively downward, is closed at a top end thereof, and has a bottom end that is spaced apart from an inside wall of the tubular portion,
wherein the conical baffle of the second type is disposed immediately above a top end of the gas inlet tube.

7. The spouted bed device of claim 6, wherein the conical baffle of the second type has a cylindrical portion which extends downward from a peripheral edge at the bottom end thereof.

8. The spouted bed device of claim 1 comprising a plurality of combinations of the cylinder, the decreasing diameter member and the tubular portion.

9. The spouted bed device of claim 8, wherein the combinations of the cylinder, the decreasing diameter member and the tubular portion are arrayed in a vertical direction.

10. A polyolefin production system comprising:
an olefin pre-reactor which polymerizes olefin in the presence of an olefin polymerization catalyst to form polyolefin particles; and
a spouted bed device which is connected as a subsequent stage to the olefin pre-reactor,
wherein the spouted bed device comprises:
a vertically extending cylinder;
a decreasing diameter member which is formed on the cylinder, has an inside diameter that decreases progressively downward, and has a gas inlet orifice at a bottom end thereof;
a tubular portion which extends downward from an edge of the gas inlet orifice; and
a conical baffle of a first type which has an outside diameter that increases progressively downward, is closed at a top end thereof, and has a bottom end that is spaced apart from an inside wall of the cylinder;
wherein the conical baffle of the first type is disposed at a position which is below and opposite a bottom end of the tubular portion.

11. A polyolefin production system comprising:
an olefin pre-reactor which polymerizes olefin in the presence of an olefin polymerization catalyst to form polyolefin particles; and
a spouted bed device which is connected as a subsequent stage to the olefin pre-reactor;
wherein the spouted bed device comprises:
a vertically extending cylinder;
a decreasing diameter member which is formed on the cylinder, has an inside diameter that decreases progressively downward, and has a gas inlet orifice at a bottom end thereof;
a tubular portion which extends downward from an edge of the gas inlet orifice, and
a cylindrical member which is disposed inside the tubular portion and at least one end of which is closed;
wherein a tubular path up to the gas inlet orifice has an annulus defined by an outside wall of the cylindrical member and an inside wall of the tubular portion.

12. A polyolefin production system comprising:
an olefin pre-reactor which polymerizes olefin in the presence of an olefin polymerization catalyst to form polyolefin particles; and
a spouted bed device which is connected as a subsequent stage to the olefin pre-reactor;
wherein the spouted bed device comprises:
a vertically extending cylinder;
a decreasing diameter member which is formed on the cylinder, has an inside diameter that decreases progressively downward, and has a gas inlet orifice at a bottom end thereof;
a tubular portion which extends downward from an edge of the gas inlet orifice;

a closed plate which closes a bottom end of the tubular portion;
a gas inlet tube which has a tubular path that is narrower than the tubular path of the tubular portion and which is disposed so as to pass through the closed plate; and
a conical baffle of a second type which has an outside diameter that increases progressively downward, is closed at a top end thereof, and has a bottom end that is spaced apart from an inside wall of the cylinder;
wherein the conical baffle of the second type is disposed immediately above a top end of the gas inlet tube.

* * * * *